(12) United States Patent
Sybert et al.

(10) Patent No.: US 9,982,130 B2
(45) Date of Patent: May 29, 2018

(54) THERMOPLASTIC COMPOSITIONS, METHODS OF THEIR MANUFACTURE, AND ARTICLES THEREOF

(71) Applicant: SABIC GLOBAL TECHNOLOGIES B.V., Bergen Op Zoom (NL)

(72) Inventors: Paul Dean Sybert, Evansville, IN (US); Jian Zhou, Evansville, IN (US); Laura Mely Ramírez, Evansville, IN (US); Yuanqing He, Newburgh, IN (US); Jinfeng Zhuge, Downingtown, PA (US); Hao Zhou, Newburgh, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days. days.

(21) Appl. No.: 15/504,038

(22) PCT Filed: Aug. 20, 2015

(86) PCT No.: PCT/US2015/046006
§ 371 (c)(1),
(2) Date: Feb. 15, 2017

(87) PCT Pub. No.: WO2016/028960
PCT Pub. Date: Feb. 25, 2016

(65) Prior Publication Data
US 2017/0283612 A1    Oct. 5, 2017

Related U.S. Application Data

(60) Provisional application No. 62/039,708, filed on Aug. 20, 2014.

(51) Int. Cl.
C08L 69/00    (2006.01)

(52) U.S. Cl.
CPC ......... *C08L 69/005* (2013.01); *C08L 2201/02* (2013.01); *C08L 2205/03* (2013.01); *C08L 2205/06* (2013.01); *C08L 2207/53* (2013.01)

(58) Field of Classification Search
CPC . C08L 69/005; C08L 2205/03; C08L 2205/06
USPC ....................................................... 524/500
See application file for complete search history.

(56) References Cited

U.S. PATENT DOCUMENTS

| | | |
|---|---|---|
| 4,455,410 A | 6/1984 | Giles, Jr. |
| 4,600,647 A | 7/1986 | Robeson et al. |
| 4,959,449 A | 9/1990 | Stautzenberger et al. |
| 6,228,910 B1 | 5/2001 | Shakhnovich |
| 6,410,620 B2 | 6/2002 | Shakhnovich |
| 6,583,256 B2 | 6/2003 | Vollenberg et al. |
| 6,607,814 B2 | 8/2003 | Pickett et al. |
| 7,695,815 B2 | 4/2010 | Argawal et al. |
| 7,709,581 B2 | 5/2010 | Glasgow et al. |
| 7,790,292 B2 | 9/2010 | Colborn et al. |
| 8,545,988 B2 | 10/2013 | Yamaguchi et al. |
| 8,969,447 B2 | 3/2015 | Van Der Mee et al. |
| 9,352,755 B2 | 5/2016 | Van Der Mee et al. |
| 2004/0197545 A1 | 10/2004 | Gehlsen et al. |
| 2006/0264582 A1 | 11/2006 | Mullen et al. |
| 2007/0027271 A1 | 2/2007 | Davis et al. |
| 2007/0100088 A1 | 5/2007 | Gallucci et al. |
| 2007/0155913 A1 | 7/2007 | Chakravarti et al. |
| 2008/0269386 A1 | 10/2008 | Chakravarti et al. |
| 2011/0274900 A1 | 11/2011 | Megally et al. |
| 2012/0208110 A1 | 8/2012 | Burns et al. |
| 2012/0251750 A1 | 10/2012 | Sybert et al. |
| 2012/0252961 A1 | 10/2012 | Sybert et al. |
| 2012/0267480 A1 | 10/2012 | Sybert et al. |
| 2013/0224462 A1* | 8/2013 | van der Mee ......... C09K 21/14 428/220 |
| 2014/0295363 A1 | 10/2014 | Sun et al. |
| 2014/0326163 A1 | 11/2014 | Van Der Mee et al. |
| 2014/0329940 A1 | 11/2014 | Van Der Mee et al. |
| 2014/0357768 A1 | 12/2014 | Sharma et al. |
| 2014/0370213 A1 | 12/2014 | Van Der Mee et al. |
| 2016/0002429 A1 | 1/2016 | Donea et al. |

FOREIGN PATENT DOCUMENTS

| | | |
|---|---|---|
| EP | 0524731 A1 | 1/1993 |
| EP | 1090744 B1 | 6/2007 |
| EP | 2423250 A2 | 2/2012 |
| EP | 2426174 A1 | 3/2012 |
| JP | 2003082201 A | 3/2003 |

(Continued)

OTHER PUBLICATIONS

Scott et al., Journal of Vinyl and Additive Technology, Sep. 1999, vol. 3, No. 3, p. 125.*
International Search Report for International Application No. PCT/US2015/046006, International Filing Date Aug. 20, 2015, date Nov. 27, 2015, 4 pages.
Written Opinion for International Application No. PCT/US2015/046006, International Filing Date Aug. 20, 2015, dated Nov. 27, 2015, 5 pages.

*Primary Examiner* — Deve E Valdez
(74) *Attorney, Agent, or Firm* — Cantor Colburn LLP

(57) ABSTRACT

A thermoplastic composition comprises, based on the total weight of the polymers in the thermoplastic composition, a polycarbonatesiloxane-arylate; 2 to 15 wt % or 2 to 8 wt % or 1 to 4 wt % of a core-shell impact modifier; a flame retardant comprising a bromine-containing polymer or oligomer effective to provide 1.5 wt % to 5 wt % of bromine; an aromatic organophosphorus compound, effective to provide 0.1 to 1 wt % of phosphorus, or a combination comprising at least one of the foregoing; and optionally 0 to 80 wt % or 0 to 60 wt % of a polyetherimide.

22 Claims, 4 Drawing Sheets

(56) References Cited

FOREIGN PATENT DOCUMENTS

| | | | |
|---|---|---|---|
| JP | 2006182980 | A | 7/2006 |
| WO | 0007812 | A1 | 2/2000 |
| WO | 0015718 | A1 | 3/2000 |
| WO | 0119921 | A1 | 3/2001 |
| WO | 2012054595 | A1 | 4/2012 |
| WO | 2013130809 | A1 | 9/2013 |
| WO | 2013175448 | A1 | 11/2013 |
| WO | 2014072923 | A1 | 5/2014 |
| WO | WO 2014/201086 | * | 12/2014 |
| WO | 2015106204 | A1 | 7/2015 |
| WO | 2015153483 | A1 | 10/2015 |
| WO | 2016085790 | A1 | 6/2016 |

* cited by examiner

US 9,982,130 B2

THERMOPLASTIC COMPOSITIONS, METHODS OF THEIR MANUFACTURE, AND ARTICLES THEREOF

CROSS REFERENCE TO RELATED APPLICATIONS

This application is a National Stage application of PCT/US15/46006, filed Aug. 20, 2015, which claims the benefit of U.S. Provisional Application No. 62/039,708, filed Aug. 20, 2014, both of which are incorporated by reference in their entirety herein.

BACKGROUND

This disclosure is directed to thermoplastic compositions, specifically polycarbonate compositions comprising polycarbonatesiloxane-arylates, their method of manufacture, and articles thereof.

Polycarbonates can be used in interior applications, such as in windows, partition walls, ceiling panels, cabinet walls, storage compartments, galley surfaces, light panels, and the like. All of these applications have stringent flammability safety requirements that the polycarbonates must meet. Particular requirements include smoke density, flame spread, and heat release values.

To date only a limited number of polycarbonate compositions have been able to pass the tests set forth for interior aircraft or train applications. However, these compositions can be brittle or notch sensitive as shown by the ASTM Notched Izod test. With the extreme amount of abuse that interior aircraft and rail parts experience, there is a need for materials that can meet the stringent fire safety requirements for flame retardant requirements, yet provide excellent toughness as measured by ASTM notched Izod test.

SUMMARY

Disclosed herein is a thermoplastic composition comprising, based on the total weight of the polymers in the thermoplastic composition, a polycarbonatesiloxane-arylate; 2 to 15 wt % or 2 to 8 wt % or 2 to 6 wt % or 1 to 4 wt % of a core-shell impact modifier (IM); a flame retardant comprising a bromine-containing polymer or oligomer effective to provide 1.5 wt % to 5 wt % of bromine, based on the total weight of the polymers in the composition; an aromatic organophosphorus compound effective to provide 0.1 to 2 wt % of phosphorus, based on the total weight of the polymers in the composition, or a combination comprising at least one of the foregoing; and optionally 0 to 80 wt % or 0 to 60 wt % of a polyetherimide; wherein a formed sample of the composition has a flame time of less than 15 seconds, a burn length of less than 6 inches, and a drip extinguishing time of less than 3 seconds, each measured using the method in the Federal Aviation Regulation (FAR) Part 25.853, in accordance with FAR 25.853(a)(1)(i) at a thickness of 1.5 mm; an OSU integrated 2 minute test value of less than 65 kW-min/m2 and a peak heat release value of less than 65 kW/m2 as measured at 1.5 mm in accordance with FAR 25.853(d); and a notched Izod value of greater than or equal to 2 ft-lbs/in at 23° C. in accordance to ASTM D256 at a thickness of 3.2 mm.

A method of manufacture of the thermoplastic compositions comprises extruding or melt-blending the components of the thermoplastic compositions to form the thermoplastic compositions.

In yet another embodiment, an article comprises the thermoplastic compositions, including a molded article, a thermoformed article, an extruded film, an extruded sheet, a foamed article, a layer of a multi-layer article, a substrate for a coated article, or a substrate for a metallized article. The article can be a transportation component, for example a component of an aircraft or train.

A method of manufacture of an article comprises molding, extruding, foaming, or casting the above-described thermoplastic composition to form the article.

The above described and other features are exemplified by the following detailed description and figures.

BRIEF DESCRIPTION OF THE DRAWINGS

A description of the figures, which are meant to be exemplary and not limiting, is provided in which.

DETAILED DESCRIPTION

Figure 1:
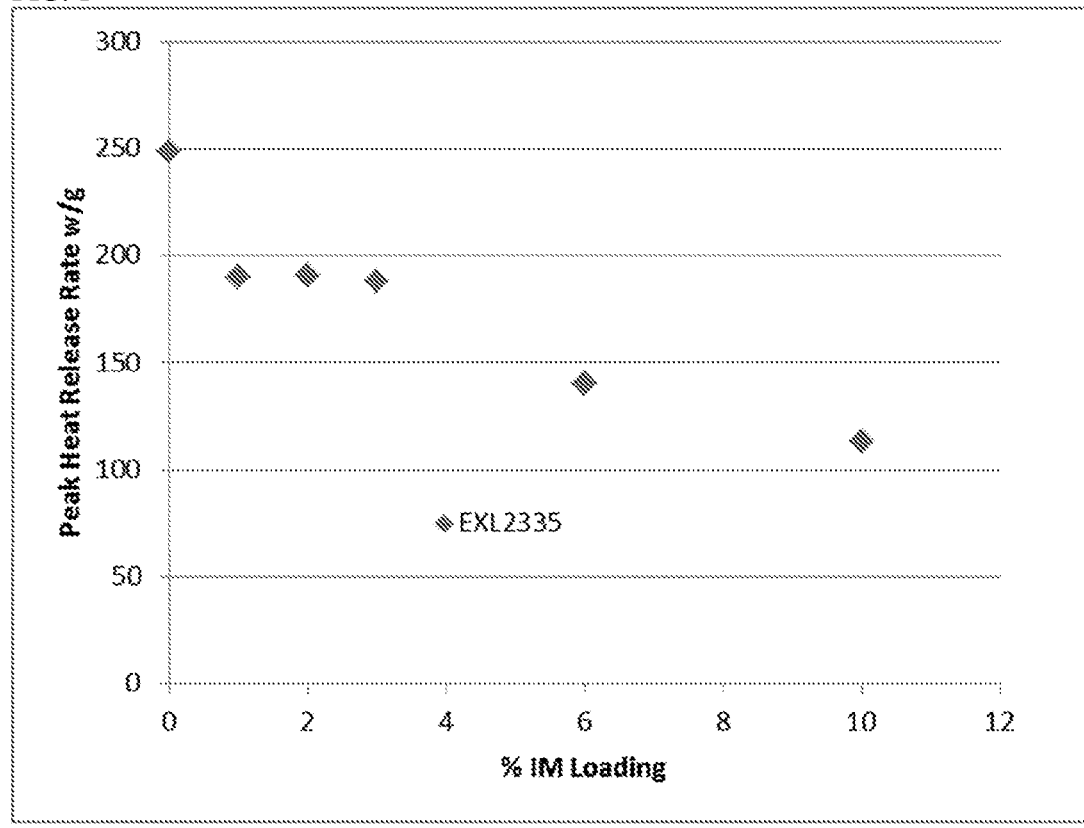
FIG. 1 shows the effect of adding a core-shell impact modifier (IM) having a cross-linked poly(butyl acrylate) core with a grafted polymethyl methacrylate shell (EXL2335) to a blend of ITR-PC-Si and TBBPA/BPA on peak heat release rate as measured by microscale combustion calorimetry.

Impact modifiers are not generally used in low heat release formulations because they are flammable and have high heat release properties. Surprisingly, the inventors hereof have found that the additional of a relatively small amount of certain impact modifiers, in particular core-shell impact modifiers, to a polycarbonatesiloxane-arylate-containing composition further reduces the heat release properties of the composition. Optionally, the polycarbonatesiloxane-arylate-containing composition comprises a halogen-containing polymer, or an organophosphorus compound, or a polyetherimide, or a combination comprising at least one of the foregoing in addition to a polycarbonatesiloxane-arylate. The discovery allows the manufacture of thermoplastic compositions that have low heat release and high notched Izod impact properties at the same time.

A sample of the composition has a flame time of less than 15 seconds, a burn length of less than 6 inches, and a drip extinguishing time of less than 3 seconds, each measured using the method of FAR 25.853, in accordance with FAR 25.853(a)(1)(i) at a thickness of 3 mm or 1.5 mm; and a notched Izod value of greater than or equal to 2 ft-lbs/in at 23° C. in accordance to ASTM D256 at a thickness of 3 mm A sample of the composition can further have at least one of the following properties: (1) a flame time of less than 15 seconds, a burn length of less than 8 inches, and a drip distinguishing time of less than 5 seconds, each measure using the method of FAR 25-853(a)(1)(ii) at a thickness of 3 mm or 1.5 mm; (2) an average peak smoke density within 4-minute equal to or less than 200 as regulated by FAR 25-853(d); (3) an average peak smoke density within 4-minute equal to or less than 150 as regulated by airbus ABD0031/ATS1000; (4) a smoke extracted from a NBS smoke chamber and measured by Draeger tube having an average concentration of the following gas components: HF<100 ppm, HCl<150 ppm, HCN<150 ppm, $SO_2$/$H_2S$<100 ppm, $NO/NO_2$<100 ppm, and CO<1000 ppm; (5) 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116; and a maximum averaged rate of heat emission of less than or equal to 90 kW/m$^2$ with 50 kW/m$^2$ irradiance level test condition according to ISO 5660-1.

The polycarbonatesiloxane-arylates comprise repeating aromatic carbonate units, siloxane units, and aromatic ester (arylate) units. The carbonate units are repeating units of formula (1)

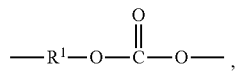         (1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

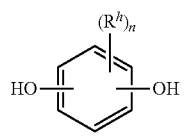         (2)

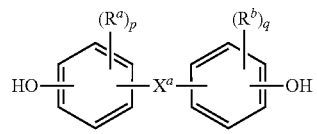         (3)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group. Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol). In an embodiment, the polycarbonate units are present as linear units derived from bisphenol A.

The polycarbonatesiloxane-arylate further comprises arylate units, i.e., ester units based on an aromatic dicarboxylic acid repeating ester units of formula (4)

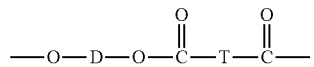         (4)

wherein D is a divalent group derived from a dihydroxy compound, and can be, for example, a $C_{6-20}$ alicyclic group or a $C_{6-20}$ aromatic group; and T is a divalent $C_{6-20}$ arylene group. In an embodiment, D is derived from a dihydroxy aromatic compound of formula (2), formula (3), or a combination comprising at least one of the foregoing dihydroxy aromatic compounds. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined number of moles of D and T groups are substituted with hydrocarbon-containing substituents such as alkyl, alkoxy, or alkylene substituents.

Examples of aromatic dicarboxylic acids from which the T group in the ester unit of formula (4) is derived include isophthalic or terephydialic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

In an embodiment, the arylate units are derived from the reaction product of one equivalent of an isophthalic acid derivative and/or terephthalic acid derivative. In such an embodiment, the arylate units of formula (5)

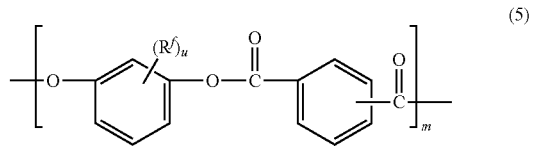

(5)

wherein each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4, and m is greater than or equal to 4. In an embodiment, m is 4 to 150, 4 to 100, specifically 5 to 30, more specifically 5 to 25, and still more specifically 10 to 20. In another embodiment, m is 4 to 150, 10 to 100, specifically 30 to 100, more specifically 50 to 100, and still more specifically 60 to 90. In another embodiment, the molar ratio of isophthalate to terephthalate can be about 0.25:1 to about 9.0:1. Preferred arylate units are isophthalate-terephthalate-resorcinol ester units, isophthalate-terephthalate-bisphenol ester units, or a combination comprising each of these, which can be referred to respectively as poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units.

In some embodiments, the carbonate units and the ester units are present as blocks of formula (6)

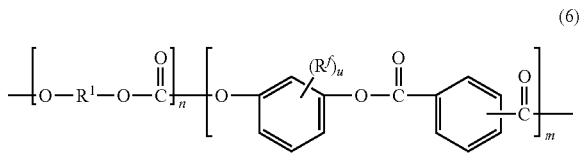

(6)

wherein $R^f$, u, and m are as defined in formula (5), each $R^1$ is independently a $C_{6-30}$ arylene group, and n is greater than or equal to one, for example 1 to 50, specifically from 3 to 25, and more specifically from 5 to 20. In an embodiment, m is 5 to 100 and n is 3 to 50, or m is 50 to 90 and n is 5 to 20, and the molar ratio of isophthalate units to terephthalate units is 80:20 to 20:80. In the foregoing embodiment, the preferred carbonate units are bisphenol A carbonate units, optionally together with resorcinol carbonate units, and the arylate units are poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units. In a specific embodiment, the carbonate and arylate units are present as a poly(isophthalate-terephthalate-resorcinol ester)-co-(resorcinol carbonate)-co-(bisphenol-A carbonate) segment.

The carbonate and arylate segments desirably comprise a minimum amount of saturated hydrocarbon present in the form of substituents or structural groups such as bridging groups or other connective groups. In an embodiment, less than or equal to 25 mol %, specifically less than or equal to 15 mol %, and still more specifically less than or equal to 10 mol % of the combined arylate units and carbonate units comprise alkyl, alkoxy, or alkylene groups. In another embodiment, the arylate ester units and the carbonate units are not substituted with non-aromatic hydrocarbon-containing substituents such as alkyl, alkoxy, or alkylene substituents.

The siloxane units of the polycarbonatesiloxane-arylates are present as polydiorganosiloxane (also referred to herein as "polysiloxane") blocks comprise repeating diorganosiloxane ("siloxane") units as in formula (7)

(7)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (7) can vary widely depending on the type and relative amount of each component in the copolymer and composition containing the copolymer, the desired properties of the composition, and like considerations. Generally, E has an average value of 2 to 1,000, specifically 2 to 500, 2 to 100, or 5 to 60, 5 to 50, or 5 to 200. In an embodiment, E has an average value of 5 to 25 or 5 to 15, and in still another embodiment, E has an average value of 30 to 80, or 30 to 70.

In an embodiment, the siloxane blocks are of formula (8)

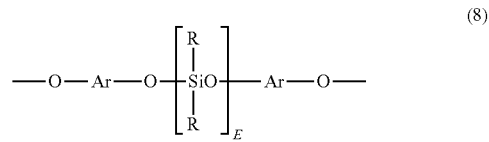

(8)

wherein E is as defined in formula (7); each R can be the same or different, and is as defined above; and Ar can be the same or different, and is a substituted or unsubstituted $C_6$-$C_{30}$ arylene, wherein the bonds are directly connected to an aromatic moiety. The Ar groups in formula (8) can be derived from a $C_6$-$C_{30}$ dihydroxyarylene compound, for example a dihydroxyarylene compound of formula (2) or formula (3). Specific dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl)

n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the Ar group is derived from resorcinol. In another embodiment, the Ar group is derived from bisphenol A.

In another embodiment, polydiorganosiloxane blocks are of formula (9)

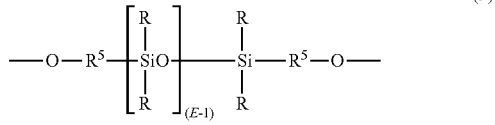

(9)

wherein R and E are as described in formula (7), and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (10):

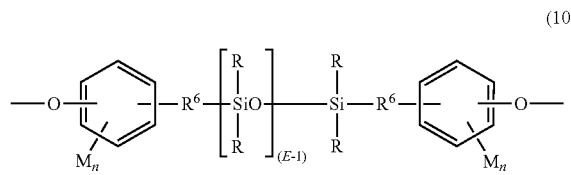

(10)

wherein R and E are as defined above. $R^6$ in formula (10) is a divalent $C_2$-$C_8$ aliphatic. Each M in formula (10) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_5$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, and R6 is a divalent $C_1$-$C_3$ aliphatic group. Specific siloxane blocks are of the formula

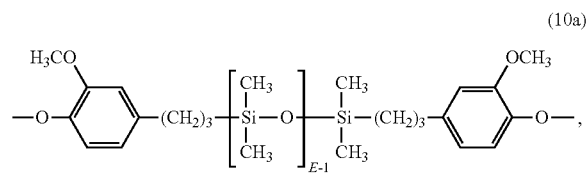

(10a)

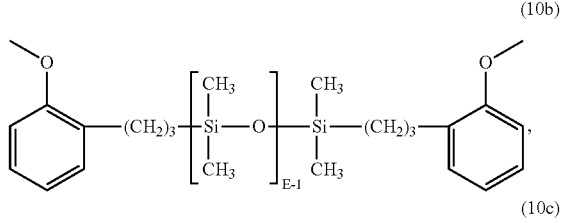

(10b)

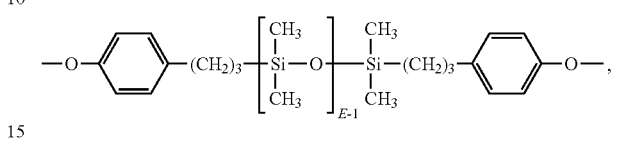

(10c)

or a combination comprising at least one of the foregoing, wherein E has an average value of 2 to 200, 2 to 125, 5 to 125, 5 to 100, 5 to 50, 20 to 80, or 5 to 20.

Blocks of formula (10) can be derived from the corresponding dihydroxy polydiorganosiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The polysiloxane units can then be endcapped, with resorcinol or bisphenol A, for example, by the synthetic procedures of European Patent Application Publication No. 0 524 731 A1 of Hoover. The endcapped polysiloxane can form an ester-linked structure with a carboxylic acid derivative during formation of the polycarbonatesiloxane-arylate, or a carbonate-linked structure by copolymerization with a carbonate precursor such as a chloroformate, phosgene, or a diaryl carbonate, or a combination of such structures.

In an embodiment, the polycarbonatesiloxane-arylate comprises siloxane units in an amount of 0.5 to 20 wt. %, specifically 1 to 10 wt. % siloxane units, based on the combined weight of siloxane units, arylate ester units, and carbonate units, and provided that siloxane units are provided by polysiloxane units covalently bonded in the polymer backbone of the polycarbonatesiloxane-arylate.

The polycarbonatesiloxane-arylate comprises siloxane units in an amount of 0.1 to 25 weight percent (wt %). In an embodiment, the polycarbonatesiloxane-arylate comprises siloxane units in an amount of 0.2 to 10 wt %, specifically 0.2 to 6 wt %, more specifically 0.2 to 5 wt %, and still more specifically 0.25 to 2 wt %, based on the total weight of the polycarbonatesiloxane-arylate, with the proviso that the siloxane units are provided by polysiloxane units covalently bonded in the polymer backbone of the polycarbonatesiloxane-arylate; 50 to 99.6 wt % arylate units, and 0.2 to 49.8 wt % carbonate units, wherein the combined weight percentages of the polysiloxane units, arylate units, and carbonate units is 100 wt % of the total weight of the polycarbonatesiloxane-arylate. In another embodiment, the polycarbonatesiloxane-arylate comprises 0.25 to 2 wt % polysiloxane units, 60 to 94.75 wt % arylate units, and 3.25 to 39.75 wt % carbonate units, wherein the combined weight percentages of the polysiloxane units, ester units, and carbonate units is 100 wt % of the total weight of the polycarbonate-siloxane-arylate.

In an embodiment, a molded test chip article having a thickness of 2.0±0.12 millimeters and consisting of the polycarbonatesiloxane-arylate can have a light transmittance greater than or equal to 60%, specifically greater than or equal to 70% and more specifically greater than or equal to 75%, according to ASTM D1003-00. In another embodiment, the test chip article having a thickness of 2.0±0.12 millimeters and consisting of the polycarbonate can have a haze less than or equal to 10%, specifically less than or equal to 5%, and most specifically less than or equal to 3%, according to ASTM D1003-00

The tough and low heat release thermoplastic compositions comprise the above-described polycarbonatesiloxane-arylates in combination with a core-shell impact modifier. The polycarbonatesiloxane-arylates can be present in an amount of 30 to 98 wt %, 35 to 97 wt %, or 40 to 90 wt %, based on the total weight of the polymers in the thermoplastic composition. The impact modifier is present in an amount of 2 to 15 wt %, 2 to 10 wt %, 2 to 8.5 wt %, 2 to 8 wt %, 2 to 6 wt %, 3 to 8.5 wt %, or 2 to 4 wt %, based on the total weight of the polymers in the thermoplastic composition.

The core-shell impact modifiers are built up from a rubber-like core on which one or more shells have been grafted. Exemplary core material includes an acrylate rubber, a silicone rubber, and a butadiene based rubber. In an embodiment, the core is an acrylate rubber derived from a C4 to C12 acrylate. In another embodiment, the core is a silicone rubber core prepared by polymerization of a cyclosiloxane in the presence of a curing agent. The butadiene based rubber includes butadiene rubber, styrene-butadiene rubber, acrylonitrile-butadiene rubber.

Typically, one or more shells are grafted on the core. Usually these shells are built up for the greater part from a vinyl aromatic compound and/or a vinyl cyanide and/or an alkyl(meth)acrylate and/or (meth)acrylic acid. Preferably the shell is derived from an alkyl(meth)acrylate, more preferable a methyl(meth)acrylate. The core and/or the shell(s) often comprise multi-functional compounds that may act as a cross-linking agent and/or as a grafting agent. These polymers are usually prepared in several stages.

In another embodiment the core-shell impact modifier comprises a multi-phase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer. Exemplary core-shell impact modifiers include those having a core of poly(butyl acrylate) and a shell of poly(methyl methacrylate), methacrylate-butadiene-styrene core-shell impact modifier, butyl acrylate-styrene-acrylonitrile, acrylonitrile-butadiene-styrene, for example high rubber grafted (HRG) acrylonitrile-butadiene-styrene, silicone-acrylic-based rubber, and butyl acrylate-methyl methacrylate polymer having a core of poly(butyl acrylate) and a shell of poly(methyl methacrylate). Preferred core-shell impact modifier comprises a butyl acrylate-methyl methacrylate copolymer which has a core of poly(butyl acrylate) and a grafted shell of poly(methyl methacrylate), a high rubber grafted acrylonitrile-butadiene-styrene (HRG-ABS) copolymer with rubber content greater than 50% by weight of the copolymer, a butyl acrylate-styrene-acrylonitrile copolymer, or a combination comprising at least of the foregoing.

The core-shell impact modifier can be of various particle sizes. For example the impact modifier can have an average diameter of size of 100 to 1,000 nm. Larger particles or mixtures of small and large particles may also be used. In some instances, especially where good appearance is required core-shell impact modifier with a particle size of 350 to 450 nm may be preferred. In other applications where higher impact is desired core-shell impact modifier particle sizes of 450 to 550 nm or 650 to 750 nm may be employed.

Optionally the thermoplastic composition further comprises a bromine-containing oligomer or polymer, an aromatic organophosphorus compound, a polyetherimide, or a combination comprising at least one of the foregoing.

The bromine containing polymer includes a specific brominated polycarbonate, i.e., a polycarbonate containing brominated carbonate units derived from 2,2',6,6'-tetrabromo-4,4'-isopropylidenediphenol (TBBPA) and carbonate units derived from at least one dihydroxy aromatic compound that is not TBBPA. The dihydroxy aromatic compound can be of formula (3) containing no additional halogen atoms. In an embodiment, the dihydroxy aromatic compound is Bisphenol-A.

The relative ratio of TBBPA to the dihydroxy aromatic compound used to manufacture the TBBPA copolymer will depend in some embodiments on the amount of the TBBPA copolymer used and the amount of bromine desired in the polycarbonate composition. In an embodiment, the TBBPA copolymer is manufactured from a composition having 30 to 70 wt % of TBBPA and 30 to 70 wt % of the dihydroxy aromatic compound, specifically Bisphenol-A, or specifically 45 to 55 wt % of TBBPA and 45 to 55 wt % of the dihydroxy aromatic compound, specifically bisphenol-A. In an embodiment, no other monomers are present in the TBBPA copolymer.

Combinations of different TBBPA copolymers can be used. Specifically, a TBBPA copolymer can be used having phenol endcaps. Also specifically, a TBBPA carbonate can be used having 2,4,6-tribromophenol endcaps can be used.

The TBBPA copolymers can have an Mw from greater than 18,000 to 30,000 Daltons, specifically 20,000 to 30,000 Daltons as measured by gel permeation chromatography (GPC) using polycarbonate standards.

The bromine-containing oligomer includes a brominated oligomer, for example, a brominated oligomer having an Mw of 18,000 Daltons or less as measured by gel permeation chromatography (GPC) using polycarbonate standards. The term "brominated oligomer" is used herein for convenience to identify a brominated compound comprising at least two repeat units with bromine substitution, and having an Mw of less than 18,000 Daltons. The brominated oligomer can have an Mw of 1000 to 18,000 Daltons, specifically 1,000 to 15,000 Daltons, and more specifically 1,000 to 10,000 Daltons as measured by GPC using polycarbonate standards. In certain embodiments, the brominated oligomer has a bromine content of 40 to 60 wt %, specifically 45 to 60 wt %, more specifically 50 to 60 wt %.

The brominated oligomer can be a brominated polycarbonate oligomer derived from brominated aromatic dihydroxy compounds (e.g., brominated compounds of formula (3)) and a carbonate precursor, or from a combination of brominated and non-brominated aromatic dihydroxy compounds, e.g., of formula (3), and a carbonate precursor. Brominated polycarbonate oligomers are disclosed, for example, in U.S. Pat. No. 4,923,933, U.S. Pat. No. 4,170, 711, and U.S. Pat. No. 3,929,908. Examples of brominated aromatic dihydroxy compounds include 2,2-bis(3,5-dibromo-4-hydroxyphenyl)propane, bis(3,5-dibromo-4-hydroxyphenyl)menthanone, and 2,2',6,6'-tetramethyl-3,3',5,5'-tetrabromo-4,4'-biphenol. Examples of non-brominated aromatic dihydroxy compounds for copolymerization with the brominated aromatic dihydroxy compounds include Bisphenol-A, bis(4-hydroxyphenyl) methane, 2, 2-bis(4-hydroxy-3-methylphenyl)propane, 4,4-bis(4-hydroxyphenyl) heptane, and (3,3'-dichloro-4,4'-dihydroxydiphenyl) methane. Combinations of two or more different brominated and non-brominated aromatic dihydroxy compounds can be used. If a combination of aromatic dihydroxy compounds is used, then the combinations can contain 25 to 55 mole percent of the brominated aromatic dihydroxy compounds and 75 to 65 mole percent of a non-brominated dihydric phenol. Branched brominated polycarbonate oligomers can also be used, as can compositions of a linear brominated polycarbonate oligomer and a branched brominated polycarbonate oligomer. Combinations of different brominated copolycarbonate oligomers can be used. Various endcaps can be present, for example polycarbonates having phenol endcaps or 2,4,6-tribromophenol endcaps can be used.

Other types of brominated oligomers can be used, for example brominated epoxy oligomers. Examples of brominated epoxy oligomers include those derived from Bisphenol-A, hydrogenated Bisphenol-A, Bisphenol-F, Bisphenol-S, novolak epoxies, phenol novolac epoxies, cresol novolac epoxies, N-glycidyl epoxies, glyoxal epoxies dicyclopentadiene phenolic epoxies, silicone-modified epoxies, and epsilon-caprolactone modified epoxies. Combinations of different brominated epoxy oligomers can be used. Specifically, a tetrabromobisphenol A epoxy be used, having 2,4,6-tribromophenol endcaps. An epoxy equivalent weight of 200 to 3000 can be used.

The bromine-containing polymer or oligomer can be present in an amount of 0 to 20 wt %, 0 to 15 wt %, 2 to 15 wt %, or 8 to 15 wt %, based on the total weight of the polymers in the thermoplastic composition. In an embodiment, the specific brominate-containing polymer or oligomer and the amount of brominate-containing polymer or oligomer are selected to provide at least 1.5 wt % bromine, 1.5 to 7 wt % bromine, 1.5 to 5 wt % bromine, or 2 to 4 wt % bromine, each based on the total weight of the polymers in thermoplastic composition.

Optionally, the thermoplastic composition further comprises a poly(imide), preferably a poly(etherimide). Poly (etherimide)s are known in the art, and included polyetherimide homopolymers and copolymers, for example poly (etherimide sulfone)s and poly(etherimide-siloxane)s. Such polyetherimides are described, for example, in U.S. Pat. No. 9,006,319, in WO 2009/10537, and in U.S. Pat. No. 8,937,127. In a specific embodiment the polyetherimide comprises units comprising bisphenol A moieties and moieties derived from p-phenylene diamine, m-phenylene diamine, sulfonyl dianiline, chemical equivalents of the foregoing diamines, or a combination comprising at least one of the foregoing diamines. The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), or 10,000 to 80,000 Daltons as measured by gel permeation chromatography, using polystyrene standards. Such polyetherimide polymers can have an intrinsic viscosity greater than 0.2 deciliters per gram (dl/g), or, more specifically, 0.35 to 0.7 dl/g as measured in m-cresol at 25° C.

The polyetherimide in the thermoplastic composition is of formula (11)

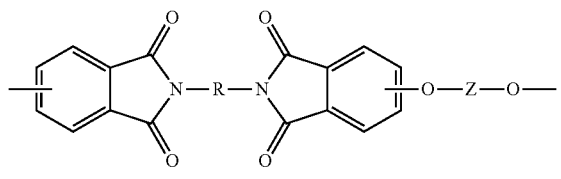

(11)

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (12)

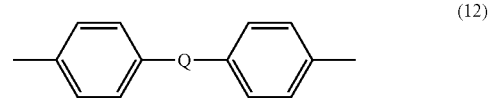

(12)

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (11) is an aromatic C$_{6-24}$ monocyclic or polycyclic group optionally substituted with 1 to 6 C$_{1-8}$ alkyl groups, 1 to 8 halogen atoms, or a combination thereof, wherein the divalent bonds of the —O—Z—O— group are in the 3,3', 3,4', 4,3', or the 4,4' positions. In a specific embodiment, R is m-phenylene and Z is 2,2-bis(1', 4'-phenylene)isopropylidene.

In an embodiment, R in formula (11) is a divalent radical of one of the following formulas

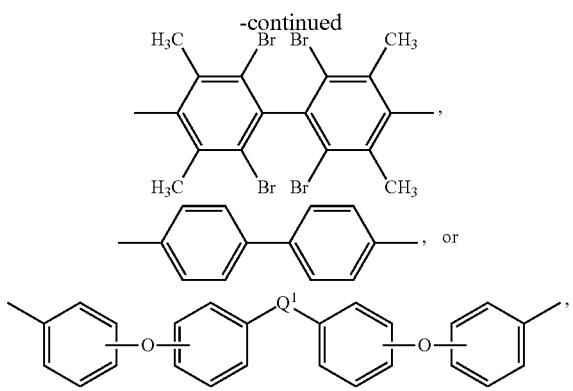

wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (13)

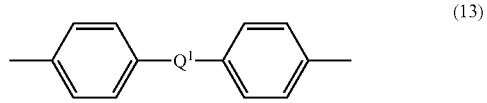

(13)

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide. Specific polyetherimides and methods for their manufacture are described for example, in U.S. Pat. No. 3,852,242; U.S. Pat. No. 6,310,145; and U.S. Pat. No. 8,545,988.

The polyetherimide is present in an amount of 0 to 60 wt %, 5 to 60 wt %, 10 to 60 wt, 20 to 55 wt %, 30 to 55 wt %, or 40 to 55 wt %, based on the total weight of the polymers in the thermoplastic composition.

The organophosphorus compounds in the thermoplastic composition include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted C$_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol-A), a monoarylene group (e.g., a 1,3-phenylene or a 1,4-phenylene), or a combination comprising at least one of the foregoing.

The phosphorus-containing group can be a phosphate (P(=O)(OR)$_3$), phosphite (P(OR)$_3$), phosphonate (RP(=O)(OR)$_2$), phosphinate (R$_2$P(=O)(OR)), phosphine oxide (R$_3$P(=O)), or phosphine (R$_3$P), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula (GO)$_3$P=O, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Specific aromatic organophosphorus compounds have two or more phosphorus-containing groups, and are inclusive of acid esters of formula (15)

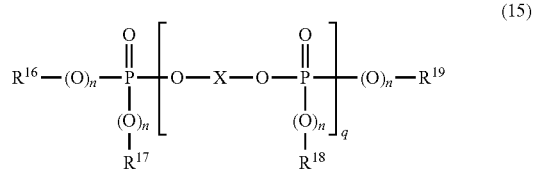

(15)

wherein R$^{16}$, R$^{17}$, R$^{18}$, and R$^{19}$ are each independently C$_{1-8}$ alkyl, C$_{5-6}$ cycloalkyl, C$_{6-20}$ aryl, or C$_{7-12}$ arylalkylene, each optionally substituted by C$_{1-12}$ alkyl, specifically by C$_{1-4}$ alkyl and X is a mono- or poly-nuclear aromatic C$_{6-30}$ moiety or a linear or branched C$_{2-30}$ aliphatic radical, which can be OH-substituted and can contain up to 8 ether bonds, provided that at least one of R$^{16}$, R$^{17}$, R$^{18}$, R$^{19}$, and X is an aromatic group. In some embodiments R$^{16}$, R$^{17}$, R$^{18}$, and R$^{19}$ are each independently C$_{1-4}$ alkyl, naphthyl, phenyl(C$_{1-4}$)alkylene, or aryl groups optionally substituted by C$_{1-4}$ alkyl. Specific aryl moieties are cresyl, phenyl, xylenyl, propylphenyl, or butylphenyl. In some embodiments X in formula (15) is a mono- or poly-nuclear aromatic C$_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups,

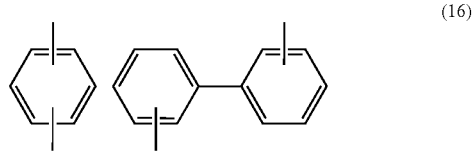

(16)

-continued

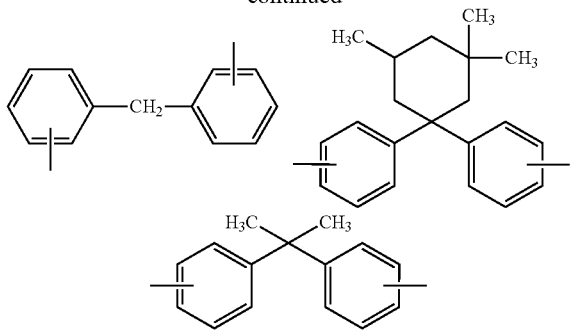

wherein the monophenylene and bisphenol-A groups can be specifically mentioned.

In these embodiments, each of $R^{16}$, $R^{17}$, and $R^{19}$ can be aromatic, i.e., phenyl, $R^{18}$, n is 1, and q is 1-5, specifically 1-2. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis (diphenyl phosphate), also known as RDP. Another specific class of aromatic organophosphorus compounds having two or more phosphorus-containing groups are compounds of formula (17)

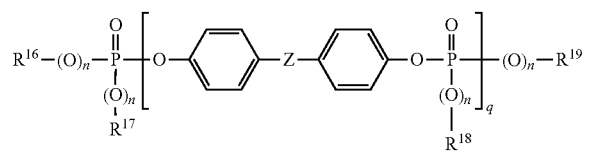

(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —$SO_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Accordingly, depending on the particular organophosphorus compound used, the thermoplastic compositions can comprise from 0 to 15 wt %, 1 to 15 wt %, 2 to 12 wt %, 0.3 to 8.5 wt %, or 0.5 to 8.0 wt %, or 3.5 to 7.5 wt % of the organophosphorus flame retardant, based on the total weight of the polymers in the thermoplastic composition. Specifically, the organophosphorus compounds can be bisphenol A bis(diphenyl phosphate), triphenyl phosphate, resorcinol bis (diphenyl phosphate), tricresyl phosphate, an oligomeric phosphate ester (such as Fyrolflex SolDP from ICL Industrial), or a combination comprising at least one of the foregoing.

The thermoplastic compositions can include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per parts per hundred parts by weight of the polymers (PHR) or up to 12 wt. % based on the total weight of the composition. In an embodiment, the composition comprises filler such as 1-5 wt % talc based on the total weight of the composition.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

As discussed above, the thermoplastic compositions are formulated to meet strict heat release and smoke density requirements. A sample of the composition has at least one of the following properties: a flame time of less than 15 seconds, a burn length of less than 6 inches, and a drip extinguishing time of less than 3 seconds, each measured using the method of FAR 25.853, in accordance with FAR 25.853(a)(1)(i) at a thickness of 3 mm or 1.5 mm; a flame time of less than 15 seconds, a burn length of less than 8 inches, and a drip distinguishing time of less than 5 seconds, each measure using the method of FAR 25-853(a)(1)(ii) at a thickness of 3 mm or 1.5 mm; an average peak smoke density within 4-minute equal to or less than 200 as regulated by FAR 25-853(d); an average peak smoke density within 4-minute equal to or less than 150 as regulated by airbus ABD0031/ATS1000; a smoke extracted from a NBS smoke chamber and measured by Draeger tube having an average concentration of the following gas components: HF<100 ppm, HCl<150 ppm, HCN<150 ppm, $SO_2$/$H_2S$<100 ppm, NO/$NO_2$<100 ppm, and CO<1000 ppm; 2 minute integrated heat release rate of less than or equal to 65 kilowatt-minutes per square meter (kW-min/m²) and a peak heat release rate of less than 65 kilowatts per square meter (kW/m²) as measured using the method according to Part IV, OSU Heat Release of FAR/JAR 25.853, Amendment 25-116; and a maximum averaged rate of heat emission of less than or equal to 90 kW/m2 with 50 kW/m2 irradiance level test condition according to ISO 5660-1.

The thermoplastic compositions can further have excellent impact properties, in particular notched Izod impact in accordance to ASTM D256. The thermoplastic composition can have a notched Izod value of greater than or equal to 2, greater than or equal to 3, greater than or equal to 4, greater than or equal to 5, greater than or equal to 6, greater than or equal to 7, greater than or equal to 9, greater than or equal to 10, or greater than or equal to 11 ft-lbs/in in accordance to ASTM D256 at a thickness of 3 mm Shaped, formed, or molded articles comprising the thermoplastic compositions are also provided. The thermoplastic compositions can be molded into useful shaped articles by a variety of means such as injection molding, extrusion, rotational molding, blow molding, and thermoforming to form articles. Thus the thermoplastic compositions can be used to form a foamed article, a molded article, a thermoformed article, an extruded film, an extruded sheet, a layer of a multi-layer article, e.g., a cap-layer, a substrate for a coated article, or a substrate for a metallized article. These values can be obtained in articles having a wide range of thicknesses, for example from 0.1 to 10 mm, or 0.5 to 5 mm.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like.

Illustrative articles include a thermoformable decorative laminate comprising of a surface layer, a backing layer and a color layer disposed between the surface layer and the backing layer. The compositions of this disclosure can be used in the surface layer or the backing layer or both. In addition to the backing layer, color layer and surface layer, the laminates can include tie layers to enhance the adhesion between the various layers.

In an embodiment, the thermoplastic compositions are formulated to provide articles that meet certain criteria set forth in Federal Aviation Regulation (FAR) Part 25.853 and/or European Railway standard EN-45545 (2013). Thus, while thermoplastic compositions can be used for the manufacture of a wide variety of articles, including high occupancy structures such as rail stations, airports and office buildings, the thermoplastic compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g., trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing.

The thermoplastic compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators, baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The poly(siloxane) copolymer compositions can be formed (e.g., molded) into sheets that can be used for any of the above mentioned components. It is generally noted that the overall size, shape, thickness, optical properties, and the like of the polycarbonate sheet can vary depending upon the desired application.

The thermoplastic compositions having low heat release rates and high notched Izod impact properties are further illustrated by the following non-limiting examples.

EXAMPLES

The materials used in the Examples are described in Table 1. Amounts of components are in wt %, unless otherwise indicated.

TABLE 1

| Component | Trade name; chemical description | Source |
|---|---|---|
| ITR-PC-Si | Polysiloxane-ITR (Isophthalic acid-terephthalic acid-resorcinol) - bisphenol-A copolyestercarbonate copolymer; with an ester content 83 mol %, siloxane content 1 wt % (average siloxane chain length about 10), interfacial polymerization, Mw = 22,500 to 26,500 g/mol, para-cumylphenol end-capped | SABIC |
| TBBPA/BPA | A tetrabromobisphenol A (TBBPA) and bisphenol A (BPA) copolycarbonate (about 30 mol % TBBPA) with an average Mw of about 22,500 g/mol determined via GPC with polycarbonate standards, p-cumylphenol (PCP) endcap | SABIC |
| PC-Si | PDMSi (polydimethylsiloxane) - bisphenol A polycarbonate copolymer, produced via interfacial polymerization, 20 wt % siloxane, average PDMS block length of about 45 units (D45), Mw about 30,000 g/mol as determined by GPC using polycarbonate standards, para-cumylphenol (PCP) end-capped | SABIC |
| PEI | Polyetherimide made via reaction of bisphenol A dianhydride with equimolar amount of m-phenylene diamine, Mw about 31,000-35,000 g/mol, determined via GPC using polystyrene standards | SABIC |

TABLE 1-continued

| Component | Trade name; chemical description | Source |
|---|---|---|
| EXL2335 | PARALOID* EXL2335 is a core-shell impact modifier and has a cross-linked poly(butyl acrylate) core with a grafted polymethyl methacrylate shell | Dow Chemical Company |
| EXL2314 | PARALOID* EXL2314 is an acrylic impact modifier with reactive functionality in the shell | Dow Chemical Company |
| EXL2691J | PARALOID* EXL2691 is a methacrylate-butadiene-styrene (MBS) core-shell impact modifier | Dow Chemical Company |
| ASA | Butyl acrylate-styrene-acrylonitrile terpolymer | SABIC |
| HRG-ABS | High rubber grafted (HRG) acrylonitrile-butadiene-styrene copolymer with rubber content greater than 50% by weight of the grafted copolymer | |
| Metablen S 2001 | Silicone-acrylic-based rubber impact modifier | Mitsubishi Rayon Carbon Fiber and Composites |
| 4-7081 | Silicone additive | Dow Corning Company |
| EEA | Amplify EA 102, Ethylene-ethyl acrylate copolymer with EA <20% | Dow Chemical Company |
| EXL 3330 | PARALOID EXL 3330, Butyl acrylate-methyl methacrylate polymer impact modifier having a core-shell structure | Dow Chemical Company |
| BPADP | CR-741; Bisphenol A diphosphate | Nagase (Europe) GmbH |
| PEPQ | Tetrakis(2,4-di-tert-butylphenyl)[1,1-biphenyl]-4,4'diylbisphosphonite | Clariant |

The tests performed are summarized in Table 2.

TABLE 2

| Description | Test | Specimen | Property | Units |
|---|---|---|---|---|
| NBS Smoke density | FAR 25-853(d) | | Flaming Dmax | — |
| ISO Heat release | ISO 5660-1 | plaque 100 × 100 × 3 mm | MARHE | $kW/m^2$ |
| OSU Peak Heat release | FAR 25.853 | plaque 15.2 × 15.2 cm × 3 mm | 2 Min/Peak Rate | $kW/m^2$ |
| Vertical Burn | FAR 25.853(a), Appendix F, Part I, (a), 1, (i) | plaque 76 × 305 × 1.5 mm | Burn time/ Burn length/ LBP | sec/inch/sec |
| Melt volume flow rate | ASTMD1238 | Pellets | MVR | $cm^3/10$ min |
| Notched Izod Impact | ASTM D4812 ASTM D256 | 0.5 × 2.5 × 0.125" | NI impact strength | J/m or ft-lbs/in |
| Microscale Combustion Calorimetry (MCC) | ASTMD7309 | Pellets | Temperature at peak heat release | °C. |
| MCC | ASTMD7309 | Pellets | Peak heat release | w/g |
| MCC | ASTMD7309 | Pellets | Total heat release | KJ/g |

The tests executed are indicative tests. They were performed according to their respective ISO, ASTM, and OSU standards, but were not executed by an officially certified test institute.

Examples 1-7

Examples 1-7 demonstrate the effect of the addition of different impact modifiers to a blend of ITR-PC-Si and TBBPA/BPA copolymer. Formulations and results are shown in Table 3.

TABLE 3

| Component | Unit | Control | CEx1 | Ex2 | CEx3 | Ex4 | CEx5 | Ex6 | Ex7 |
|---|---|---|---|---|---|---|---|---|---|
| ITR-PC-Si | % | 87.94 | 86.94 | 84.94 | 86.94 | 84.94 | 86.94 | 84.94 | 84.94 |
| TBBPA/BAP | % | 12 | 12 | 12 | 12 | 12 | 12 | 12 | 12 |
| PEPQ | % | 0.06 | 0.06 | 0.06 | 0.06 | 0.06 | 0.06 | 0.06 | 0.06 |
| % Impact Modifier | % | 0 | 1 | 3 | 1 | 3 | 1 | 3 | 3 |
| Impact Modifier | | None | EXL 2335 | EXL 2335 | EXL 2691J | EXL 2691J | EXL 2314 | EXL 2314 | EXL 2314 |
| Property | | | | | | | | | |
| MVR 6 min dwell time | $cm^3/10$ min | 4.7 | 6.8 | 6.1 | 6.0 | NA | 6.4 | 5.9 | 6.1 |
| Izod Impact | % | 0 | 0 | 100 | 0 | 100 | 0 | 100 | 100 |
| Impact Strength-Avg | J/m | 167 | 236 | 663 | 241 | 488 | 226 | 676 | 576 |
| Impact Strength-Avg | ft-lbs/in | 3.1 | 4.4 | 12.4 | 4.5 | 9.1 | 4.2 | 12.7 | 10.8 |

TABLE 3-continued

| Component | Unit | Control | CEx1 | Ex2 | CEx3 | Ex4 | CEx5 | Ex6 | Ex7 |
|---|---|---|---|---|---|---|---|---|---|
| FAA Flame Testing | | | | | | | | | |
| 60 s Vertical Burn-burn time | sec | | 0 | 0 | | | | | |
| 60 s Vertical Burn-burn length | In | | 4 | 5.1 | | | | | |
| 60 s Vertical Burn-LBP | sec | | None | None | | | | | |
| OSU 2 min Heat Release | kW-min/m$^2$ | | 34 | 36 | | | | | |
| OSU Peak Heat Release | kW/m$^2$ | | 33 | 36 | | | | | |
| EN45545 (measured at 1 mm) | | | | | | | | | |
| MARHE per ISO 56601-1 | kW/m$^2$ | | 79 | | | | | 76 | |
| MCC | | | | | | | | | |
| Temperature at Peak HR | ° C. | | 482 | 450 | | | | 458 | |
| Peak HR Rate | w/g | | 220 | 140 | | | | 164 | |
| Total HR (300° C. to 700° C.) | kJ/g | | 10 | 10.5 | | | | 10.9 | |

*The control and examples 1-7 had colorants added to provide a dark grey appearance.

As seen from Table 3, an effective amount of impact modifier for improved toughness is greater than or equal to about 2%. As seen from the OSU and MARHE testing results, 3% impact modifier provides compositions that pass both the OSU 65/65 requirements (2 min Total heat release/Peak heat release rate) for Aircraft and the MARHE requirements (less than or equal to 90) for the EN45545 EU, Hazard Level 2, rail applications. Even more surprising, the microscale combustion calorimetry testing (MCC) shows that the peak heat release rate is decreased with the addition of the core-shell impact modifiers.

Examples 8-14

Figure 2:
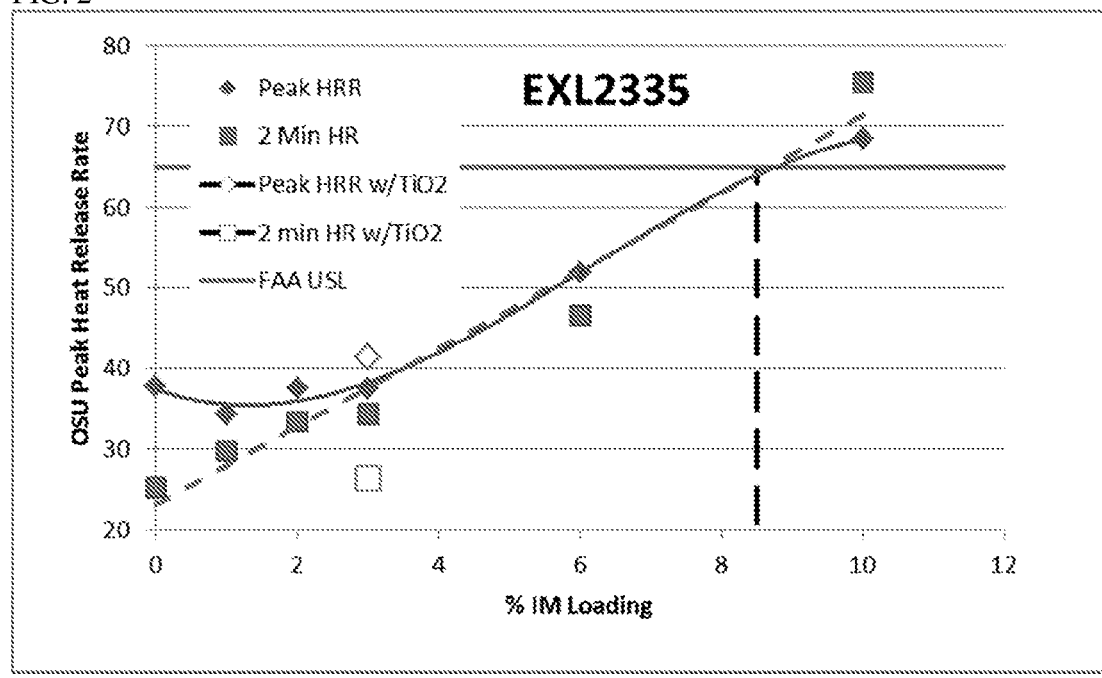
FIG. 2 shows the effect of adding a core-shell impact modifier having a cross-linked poly(butyl acrylate) core with a grafted polymethyl methacrylate shell (EXL2335) to a blend of ITR-PC-Si and TBBPA/BPA on OSU peak heat release rate.

Examples 8-14 demonstrate the effect of the addition of different amounts of a core-shell impact modifier having a cross-linked poly(butyl acrylate) core with a grafted polymethyl methacrylate shell to a blend of ITR-PC-Si and TBBPA/BPA copolymer. Formulations and results are shown in Table 4. The results are also graphically illustrated in FIGS. 1 and 2.

TABLE 4

| Component | Unit | Control | Ex8 | Ex9 | Ex10 | Ex11 | Ex12 | Ex13* |
|---|---|---|---|---|---|---|---|---|
| ITR-PC-Si | % | 87.94 | 86.94 | 85.94 | 84.94 | 81.94 | 77.94 | 84.94 |
| TBBPA/BPA | % | 12 | 12 | 12 | 12 | 12 | 12 | 12 |
| PEPQ | % | 0.06 | 0.06 | 0.06 | 0.06 | 0.06 | 0.06 | 0.06 |
| % Impact Modifier | % | 0 | 1 | 2 | 3 | 6 | 10 | 3 |
| Impact Modifier | | EXL 2335 | EXL 2335 | EXL 2335 | EXL 2335 | EXL 2335 | EXL 2335 | EXL 2335 |
| Property | | | | | | | | |
| MVR 6 min dwell time | cm$^3$/10 min | 5.2 | 5.1 | 4.9 | 4.3 | 3.7 | 2.9 | 3.9 |
| Izod Impact | % | 0 | 100 | 100 | 100 | 100 | 100 | 100 |
| Impact Strength-Avg | J/m | 220 | 864 | 772 | 759 | 705 | 659 | 699 |
| Impact Strength-Avg | Ft-lbs/in | 4.1 | 16.2 | 14.5 | 14.2 | 13.2 | 12.3 | 13.1 |
| FAA Flame Testing | | | | | | | | |
| 60 s Vertical Burn-burn time | sec | 0.7 | 0 | 0.5 | 0 | 0 | 0 | 0.3 |
| 60 s Vertical Burn-burn length | In | 3.2 | 3 | 3.1 | 2.8 | 3 | 3.4 | 3.2 |
| 60 s Vertical Burn-LBP | sec | 0 | 0 | 0 | 0 | 0 | 0 | 0 |
| OSU 2 min Heat Release | kW-min/m$^2$ | 25 | 30 | 33 | 34 | 47 | 75 | 26 |
| OSU Peak Heat Release | kW/m$^2$ | 38 | 34 | 37 | 38 | 52 | 68 | 41 |
| EN45545 (measured at 1 mm) | | | | | | | | |
| MARHE per ISO 5660-1 | kW/m$^2$ | 91.5 | 110 | 95 | 93 | 103 | 133 | 70 |
| MCC | | | | | | | | |
| Temperature at Peak HR | ° C. | 481 | 464 | 461 | 457 | 455 | 455 | |
| Peak HR Rate | w/g | 249 | 190 | 190 | 188 | 140 | 113 | |
| Total HR (300° C. to 700° C.) | kJ/g | 10.8 | 10.9 | 11.2 | 11.6 | 12.2 | 12.8 | |

*Contains 2% TiO$_2$ colorant based on the total weight of the polymers in the composition.

The results show that with as low as 1% core-shell impact modifier ductility can be achieved. Compared with Table 3, 1% impact modifier and a colored pigment do not afford consistent ductility. Thus 2% impact modifier is more preferred where colored pigments may be used.

Table 4 also shows that all samples containing the added impact modifiers, which are usually assumed in the art to reduce the flame properties of resins, pass the rigorous FAA 60 sec. vertical burn test. As shown in Table 4, the microscale combustion calorimetry testing (MCC), shows that the peak heat release rate is decreased with the addition of the core-shell impact modifiers (Table 4 and FIG. 1). The total heat release is slightly increased. As seen from the OSU testing results, 3 to 8.5% impact modifier provides compositions that pass the FAA OSU 65/65 requirements (2 min Total heat release/Peak heat release rate) for Aircraft. As seen from Ex10 and Ex13 the addition of pigments such as TiO$_2$ can often have a beneficial effect on the OSU values.

Examples 14-17

Examples 14-17 demonstrate the effect of the addition of a methacrylate-butadiene-styrene core-shell impact modifier to ITR-PC copolymers, as well as the addition of alternative flame retardant agents to a blend of ITR-PC-Si and TBBPA/BPA copolymer. Formulations and results are shown in Table 5. The results are also graphically illustrated in FIGS. 3 and 4.

polymers, Table 5 shows that all samples with these added impact modifiers pass the rigorous FAA 60 sec. vertical burn test and the FAA OSU 65/65 test. As seen from Ex14 and Ex15 the addition of pigments such as TiO$_2$ can often have a beneficial effect. As shown in Tables 3 and 4, the microscale combustion calorimetry testing (MCC) shows that the peak heat release rate is decreased with the addition of 6% EXL2691, but the results are not as dramatic as EXL2335 (Table 5 and FIGS. 3 and 4). The ASA containing formulations did not show a decrease in the peak heat release rate by MCC testing (Table 5 and FIG. 3).

TABLE 5

| Component | Unit | Control | Ex14 | Ex15 | Ex16 | Ex17 |
|---|---|---|---|---|---|---|
| ITR-PC-Si | % | 87.94 | 84.94 | 84.94 | 81.94 | 84.94 |
| TBBPA/BPA | % | 12 | 12 | 12 | 12 | 12 |
| PEPQ | % | 0.06 | 0.06 | 0.06 | 0.06 | 0.06 |
| % Impact Modifier | % | 0 | 3 | 3 | 6 | 3 |
| Impact Modifier | | | EXL 2691J | EXL 2691J | EXL 2691J | ASA |
| Property | | | | | | |
| MVR 6 min dwell time | cm$^3$/10 min | 5.2 | 4.0 | 4.1 | 4.0 | 5.1 |
| Izod Impact | % | 0 | 100 | 100 | 100 | 0 |
| Impact Strength-Avg | J/m | 220 | 653 | 617 | 567 | 451 |
| Impact Strength-Avg | Ft-lbs/in | 4.1 | 12.2 | 11.6 | 10.6 | 8.4 |
| FAA Flame Testing | | | | | | |
| 60 s Vertical Burn Testing-burn time | sec | 0.7 | 0 | 0.4 | 0 | 0 |
| 60 s Vertical Burn Testing-burn length | In | 3.2 | 3.2 | 3.2 | 3.2 | 2.8 |
| 60 s Vertical Burn Testing-LBP | sec | 0 | 0 | 0 | 0 | 0 |
| OSU 2 min Heat Release | kW-min/m$^2$ | 25 | 42 | 30 | 58 | 41 |
| OSU Peak Heat Release | kW/m$^2$ | 38 | 51 | 33 | 56 | 43 |
| EN45545 (measured at 1 mm) | | | | | | |
| MARHE per ISO 5660-1 | kw/m$^2$ | 91.5 | 98 | 73.5 | 113 | 96.5 |
| MCC | | | | | | |
| Temperature at Peak HR | ° C. | | 481 | 466 | 471 | 469 |
| Peak HR Rate | w/g | | 249 | 297 | 192 | 265 |
| Total HR (300° C. to 700° C.) | kJ/g | | 10.8 | 12.2 | 12.7 | 12.2 |

* Contains about 2% TiO$_2$ pigment based on the total weight of the polymers in the composition The results shown in Table 5 demonstrate that by using 3 to 6% core-shell impact modifier ductility can be achieved. Additionally, ASA was also used at 3%. Although the ASA did improve the notched Izod value, it did not afford ductile fractures. Although the added impact modifiers are usually assumed in the art to reduce the flame performance of Examples 18-23

Examples 18-23 show the effect of adding different impact modifiers to a blend of ITR-PC-Si and TBBPA/BPA copolymer. Formulations and results are shown in Table 6. The results are also graphically illustrated in FIG. 3.

TABLE 6

| Component | Unit | Control | Ex18 | Ex19 | Ex20 | Ex21 | Ex22 | Ex23 |
|---|---|---|---|---|---|---|---|---|
| ITR-PC-Si | % | 87.94 | 84.94 | 81.94 | 84.94 | 81.94 | 84.94 | 84.94 |
| TBBPA/BPA | % | 12 | 12 | 12 | 12 | 12 | 12 | 12 |
| PEPQ | % | 0.06 | 0.06 | 0.06 | 0.06 | 0.06 | 0.06 | 0.06 |
| % Impact Modifier | % | 0 | 3 | 6 | 3 | 3 + 3 | 3 | 3 |
| Impact Modifier | | | HRG-ABS | HRG-ABS | S 2001 | HRG-ABS + 4-7081 | EEA | EXL3330 |
| Property | | | | | | | | |
| MVR 6 min dwell time | cm$^3$/10 min | 5.2 | 5.5 | 4.7 | 5.7 | 5.5 | 5.0 | 4.4 |
| Izod Impact | % | 0 | 100 | 100 | 100 | 100 | 100 | 100 |
| Impact Strength-Avg | J/m | 220 | 755 | 666 | 825 | 557 | 704 | 765 |
| Impact Strength-Avg | Ft-lbs/in | 4.1 | 14.1 | 12.5 | 15.4 | 10.4 | 13.2 | 14.3 |
| FAA Flame Testing | | | | | | | | |
| 60 s Vertical Burn-burn time | sec | 0.7 | 0 | 1.1 | 1.5 | 2.9 | 0 | 0.5 |
| 60 s Vertical Burn-burn length | In | 3.2 | 2.7 | 3.1 | 2.9 | 3.7 | 3.4 | 3.3 |
| 60 s Vertical Burn-LBP | sec | 0 | 0 | 0 | 0 | 1 | 0 | 0 |

TABLE 6-continued

| Component | Unit | Control | Ex18 | Ex19 | Ex20 | Ex21 | Ex22 | Ex23 |
|---|---|---|---|---|---|---|---|---|
| OSU 2 min Heat Release | kW-min/m$^2$ | 25 | 37 | 47 | 60 | 63 | 40 | 40 |
| OSU Peak Heat Release | kW/m$^2$ | 38 | 42 | 50 | 61 | 64 | 57 | 45 |
| EN45545 (measured at 1 mm) | | | | | | | | |
| MARHE per ISO5660-1 | kW/m$^2$ | 92 | 100 | 154 | 143 | 124 | 102 | 73 |
| MCC | | | | | | | | |
| Temperature at Peak HR | ° C. | 481 | 473 | 474 | 475 | 481 | 473 | 456 |
| Peak HR Rate | w/g | 249 | 256 | 200 | 182 | 157 | 307 | 191 |
| Total HR (300° C. to 700° C.) | kJ/g | 10.8 | 12.2 | 12.7 | 11.4 | 10.3 | 12.4 | 11.7 |

Although the impact modifiers used in examples 18-23 are usually assumed in the art to reduce the flame performance of polymers, Table 6 shows that all samples with these added impact modifiers pass the rigorous FAA 60 sec. vertical burn and the FAA 65/65 OSU tests. It is noteworthy that all though siloxane copolymers of polyarylates and polyetherimides can often lower the OSU heat release values, the impact modifiers in Table 6 that contain siloxane (Ex 20 and 21) are least effective in the OSU test.

Figure 3:
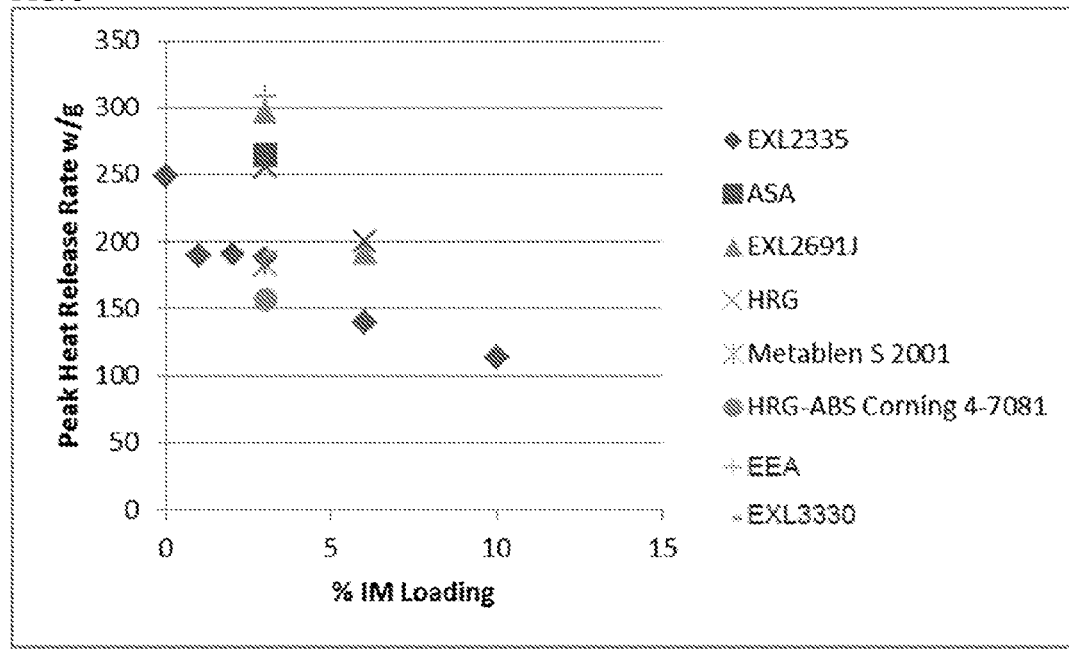
FIG. 3 shows the effect of adding various impact modifiers to a blend of ITR-PC-Si and TBBPA/BPA on peak heat release rate as measured by microscale combustion calorimetry.
Figure 4:
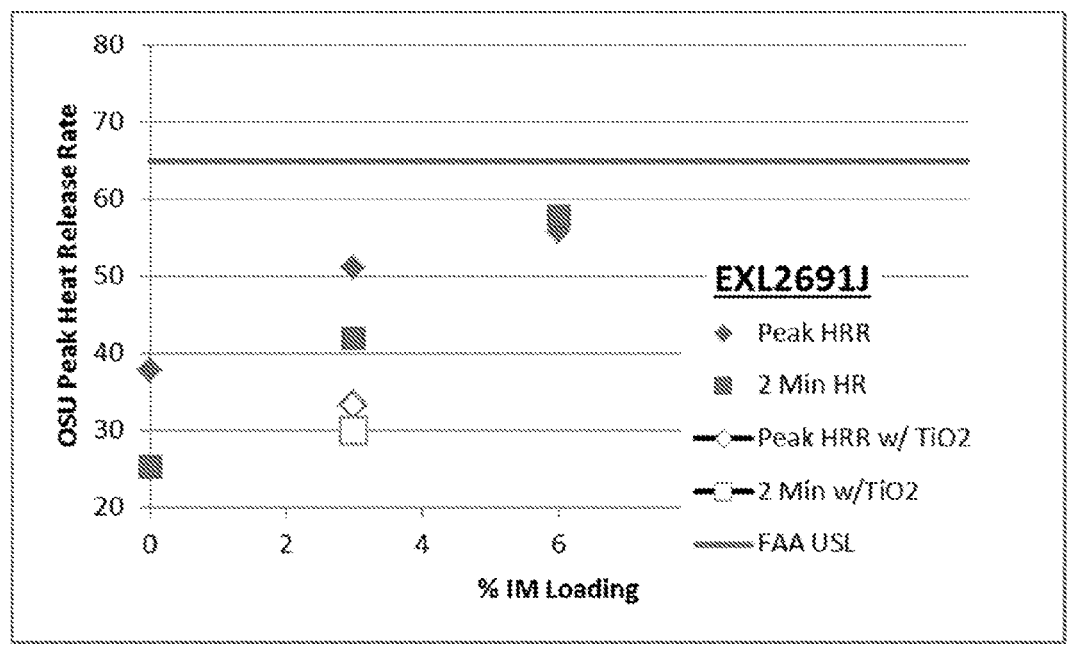
FIG. 4 shows the OSU peak heat release rate for formulations containing EXL2691J and a blend of ITR-PC-Si and TBBPA/BAP.

As with the samples in Tables 3 and 4, the microscale combustion calorimetry testing (MCC) shows that the peak heat release rate is decreased with the addition of 6% HRG, but the results are not as dramatic as EXL2335 (Table 6 and FIG. 3). Surprisingly, up to 6 wt % HRG can be added and still have OSU values below 55/55, while at the same time have blends that are 100% ductile in accordance with ASTM Notched Izod testing.

The Metablen S 2001 (silicone-acrylic-based rubber impact modifier) containing blends did show good impact modification as well the dramatic decrease in the peak heat release rate comparably to EXL2335 (FIG. 3). The compositions are OSU 65/65 compliant.

A combination of HRG and the Dow Corning 4-7081 (a silicone additive) also showed good performance for both ductility and peak heat release rate (Table 6 and FIG. 3).

The EXL 3330-containing blends show good impact modification as well the dramatic decrease in the peak heat release rate when compared to the control (FIG. 3).

The EEA-containing blend, which afforded a blend with 100% ductility by NI, gave an increase in the peak heat release rate when compared to both the control (Table 6) and the EXL2335-containing formulations (FIG. 3).

Examples 24-29

Figure 5:
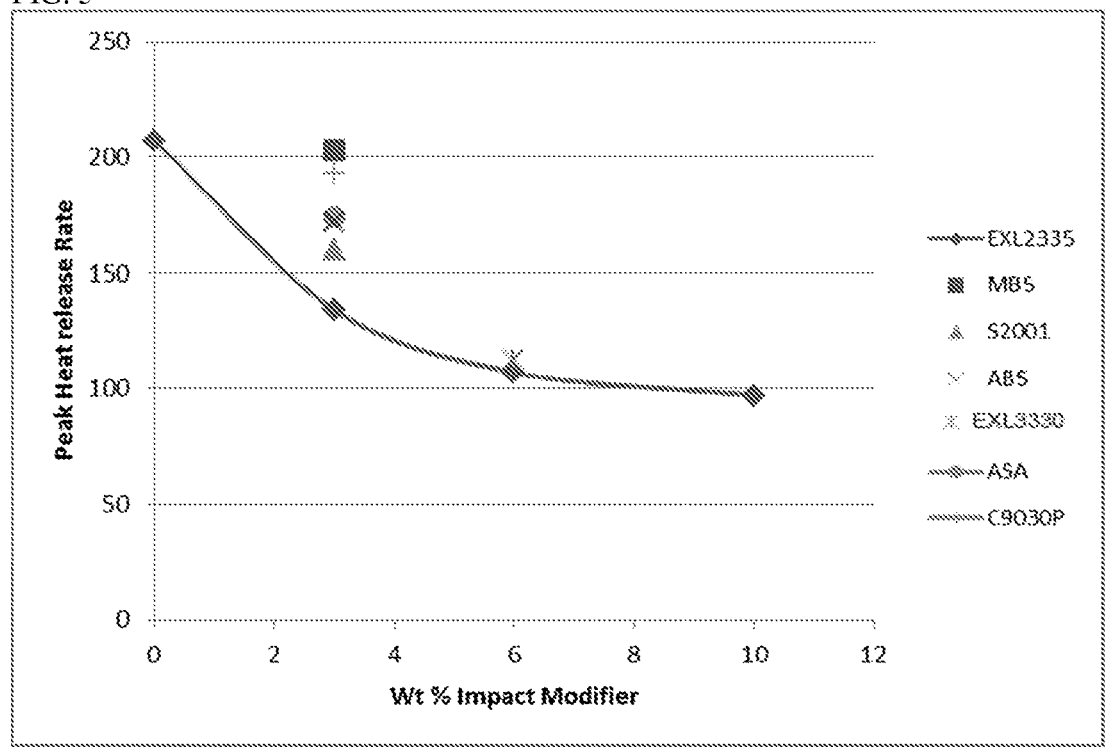
FIG. 5 shows the effect of adding various impact modifiers to a blend of ITR-PC-Si and BPADP on peak heat release rate as measured by microscale combustion calorimetry.

Examples 24-29 show the effect of adding various impact modifier to a blend of ITR-PC-Si and an aromatic organophosphorus compound (BPADP). Formulations and results are shown in Table 7. The results are also graphically illustrated in FIGS. 5 and 6.

TABLE 7

| Component | Unit | Control | Ex24 | Ex25 | Ex26 | Ex27 | Ex28 | Ex29 |
|---|---|---|---|---|---|---|---|---|
| PEPQ | % | 0.06 | 0.06 | 0.06 | 0.06 | 0.06 | 0.06 | 0.06 |
| BPADP | % | 7.5 | 7.5 | 7.5 | 7.5 | 7.5 | 7.5 | 7.5 |
| ITR-PC-Si | % | 92.44 | 89.44 | 86.44 | 82.44 | 89.33 | 89.44 | 86.44 |
| % Impact Modifier | % | 0 | 3 | 6 | 10 | 3 | 3 | 6 |
| Impact Modifier | | None | EXL 2335 | EXL 2335 | EXL 2335 | EXL 2691J | S2001 | EXL 3330 |
| Property | | | | | | | | |
| MVR 300° C./1.2 kg | cm$^3$/10 min | 9.7 | 8.7 | 8.1 | 6.6 | 10.3 | 9.8 | 7.6 |
| NII, Ductility | % | 0 | 100 | 100 | 100 | 100 | 100 | 100 |
| NII, Impact Strength | J/m | 72.1 | 720 | 715 | 662 | 763 | 811 | 801 |
| NII, Impact Strength | Ft-lbs/in | 1.4 | 13.5 | 13.4 | 12.4 | 14.3 | 15.2 | 15.0 |
| FAA Flame Testing | | | | | | | | |
| 60 s Vertical Burn-burn time | sec | 0.6 | 6.6 | 3.3 | 4.6 | 2.2 | 1.5 | 9.1 |
| 60 s Vertical Burn-burn length | In | 3.1 | 2.6 | 2.4 | 3.8 | 3.2 | 3 | 3.6 |
| 60 s Vertical Burn-LBP | sec | 0.3 | 1.7 | 3.3 | 4 | 0 | 1.5 | 1.8 |
| OSU 2 min Heat Release | kW-min/m$^2$ | 43 | 60 | 68 | 77 | 65 | 72 | 73 |
| OSU Peak Heat Release | kW/m$^2$ | 44 | 58 | 61 | 74 | 68 | 72 | 68 |
| EN45545 (measured at 1 mm) | | | | | | | | |
| MARHE per ISO5660-1 | kW/m$^2$ | 73 | 113 | 122 | 156 | 69 | 122 | 138 |
| MCC | | | | | | | | |
| Temperature at Peak HR | ° C. | 507 | 473 | 484 | 494 | 497 | 512 | 493 |
| Peak HR Rate | w/g | 207 | 134 | 107 | 97 | 203 | 130 | 112 |
| Total HR (300° C. to 700° C.) | kJ/g | 9.9 | 10.5 | 10.5 | 11.3 | 9.9 | 11 | 10.5 |

Figure 6:
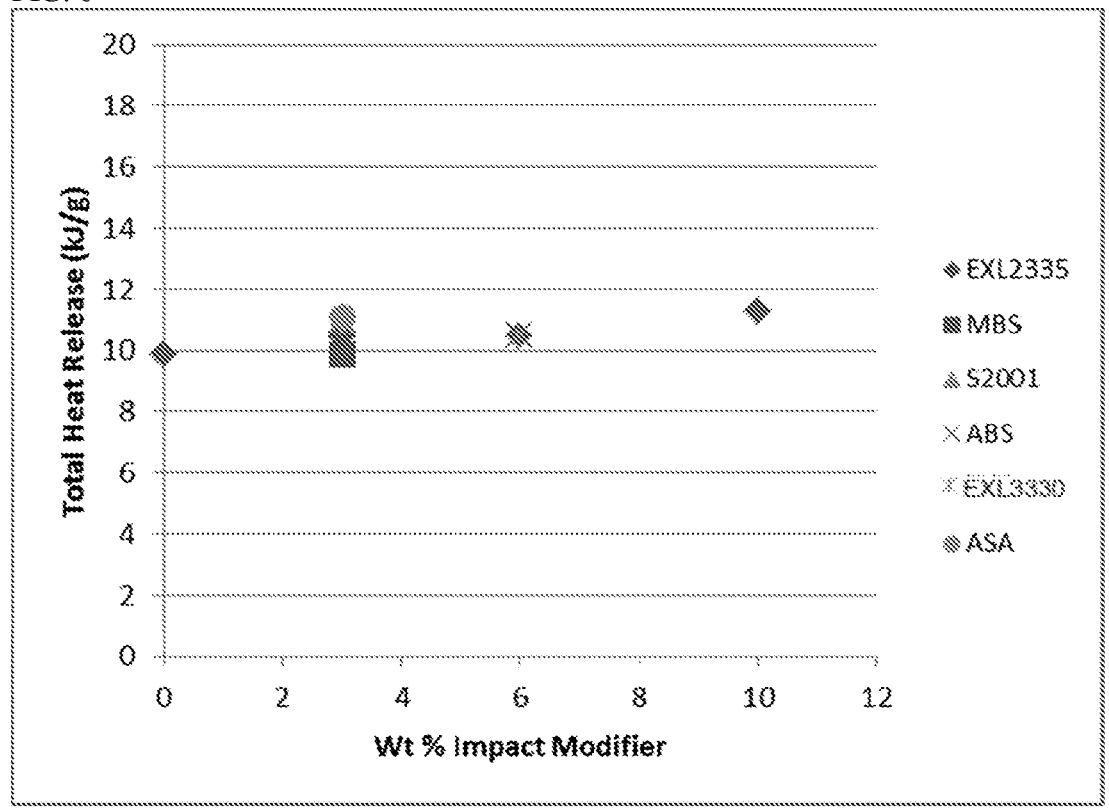
FIG. 6 shows the effect of adding various impact modifiers to a blend of ITR-PC-Si and BPADP on total heat release rate as measured by microscale combustion calorimetry.

As seen from Table 7, the control has a low notched Izod value. The addition of impact modifiers EXL2335, MBS, S2001, and EXL3330 increases the NI values from 1.5 and brittle to over 10 ft-lbs/in and 100% ductile. Even more surprisingly is that by the addition of the core-shell impact modifiers, which in and of themselves have high peak heat release rates, to a low peak heat release rate blend of ITR-PC-Si and BPADP, that the peak heat release rate (by MCC) is actually reduced (Table 7 and FIG. 5). Total heat release rate is only slightly increased by the addition of the impact modifiers (FIG. 6). The OSU heat release results in combination notched Izod data shows that with the blend containing BPADP and ITR-PC-Si, EXL2335 is the most preferred impact modifier and the most preferred level is 2 to 4%.

Examples 30-33

Examples 30-33 show the effect of adding various impact modifier to a blend of ITR-PC-Si and an aromatic organophosphorus compound (BPADP). Formulations and results are shown in Table 8. The results are also graphically illustrated in FIGS. 5 and 6.

The ABS- and EEA-containing formulations show good impact with 100% ductility. Although the EEA provided excellent toughness in the test, the molded parts showed unacceptable delamination.

The EXL3330-containing blends show excellent impact improvement as well the dramatic decrease in the peak heat release rate when compared to the control (FIG. 3).

Surprisingly, the addition of the PC-Si, a known copolymer for improving the toughness of PC blends, did not show a significant improvement in the ductility of the ITR-PC-Si and BPADP blend or a dramatic decrease in the peak heat release rate (Table 8, FIG. 3).

TABLE 8

| Component | Unit | Control | Ex30 | Ex31 | Ex32 | Ex33 |
|---|---|---|---|---|---|---|
| PEPQ | % | 0.06 | 0.06 | 0.06 | 0.06 | 0.06 |
| BPADP | % | 7.5 | 7.5 | 7.5 | 7.5 | 7.5 |
| ITR-PC-Si | % | 92.44 | 89.44 | 89.44 | 89.44 | 86.44 |
| % Impact Modifier | % | 0 | 3 | 3 | 3 | 6* |
| Impact Modifier | | None | ASA | HRG-ABS | PC-Si | EEA |
| Property | | | | | | |
| MVR 300° C./1.2 kg | cm$^3$/10 min | 9.7 | 8.9 | 9.5 | 8.7 | 8.8 |
| NII, Ductility | % | 0 | 0 | 100 | 0 | 100 |
| NII, Impact Strength | J/m | 72.1 | 244 | 761 | 136 | 684 |
| NII, Impact Strength | Ft-lbs/in | 1.4 | 4.6 | 14.3 | 2.5 | 12.8 |
| FAA Flame Testing | | | | | | |
| 60 s Vertical Burn Testing-burn time | sec | 0.6 | 1.3 | 1.5 | 0.8 | 0.6 |
| 60 s Vertical Burn Testing-burn length | In | 3.1 | 2 | 2.3 | 2.3 | 3.1 |
| 60 s Vertical Burn Testing-LBP | sec | 0.3 | 0.3 | 1.7 | 0 | 0.3 |
| OSU 2 min Heat Release | kW-min/m$^2$ | 43 | 58 | 61 | 41 | 44 |
| OSU Peak Heat Release | kW/m$^2$ | 44 | 55 | 58 | 45 | 44 |
| EN45545 (measured at 1 mm) | | | | | | |
| MARHE per ISO5660-1 | kW/m$^2$ | 73 | 74 | 63 | 122 | |
| MCC | | | | | | |
| Temperature at Peak HR | ° C. | 507 | 484 | 503 | 513 | 485 |
| Peak HR Rate | w/g | 207 | 174 | 172 | 193 | 162 |
| Total HR (300° C. to 700° C.) | kJ/g | 9.9 | 11.1 | 10.8 | 10.1 | 12.7 |

*Delaminated

Examples 34-37

Examples 34-37 show the effect of adding various impact modifier to a blend of ITR-PC-Si and PEI. Formulations and results are shown in Table 9. The results are also graphically illustrated in FIGS. 7 and 8.

TABLE 9

| Component | Unit | Control | Ex34 | Ex35 | Ex36 | Ex37 |
|---|---|---|---|---|---|---|
| HS | % | 0.1 | 0.1 | 0.1 | 0.1 | 0.1 |
| BPADP | % | 4 | 4 | 4 | 4 | 4 |
| PEI | % | 50 | 50 | 50 | 50 | 50 |
| ITR-PC-Si | % | 45.9 | 44.9 | 42.9 | 39.9 | 35.9 |
| % Impact Modifier | % | 0 | 1 | 3 | 6 | 10 |
| Impact Modifier | | None | EXL 2335 | EXL 2335 | EXL 2335 | EXL 2335 |
| Property | | | | | | |
| MVR 300° C./1.2 kg | cm$^3$/10 min | 3.4 | 3.2 | 2.78 | 2.38 | 2.23 |
| NII, Ductility | % | 0 | 0 | 0 | 0 | 75 |
| NII, Impact Strength | J/m | 61 | 69 | 116 | 235 | 460 |
| NII, Impact Strength | Ft-lbs/in | 1.1 | 1.3 | 2.2 | 4.4 | 8.6 |

TABLE 9-continued

| Component | Unit | Control | Ex34 | Ex35 | Ex36 | Ex37 |
|---|---|---|---|---|---|---|
| MAI, Ductility | % | 100 | 100 | 100 | 100 | 100 |
| MAI, Max load | J | 77 | 83 | 79.9 | 76.4 | 65.2 |
| FAA Flame Testing | | | | | | |
| 60 s Vertical Burn Testing-burn time | sec | 1 | 0.3 | 0 | 0 | 0 |
| 60 s Vertical Burn Testing-burn length | In | 1.5 | 2 | 1.9 | 2.2 | 2.4 |
| 60 s Vertical Burn Testing-LBP | sec | 0 | 0 | 0 | 0 | 0 |
| OSU 2 min Heat Release | kW-min/m$^2$ | 26 | 19 | 20 | 19 | 33 |
| OSU Peak Heat Release | kW/m$^2$ | 35 | 38 | 42 | 52 | 56 |
| EN45545 (measured at 1 mm) | | | | | | |
| MARHE per ISO5660-1 | kW/m$^2$ | 41 | 37 | 28 | 28 | 40 |
| MCC | | | | | | |
| Temperature at Peak HR | ° C. | 516 | 508 | 496 | 511 | 513 |
| Peak HR Rate | w/g | 141 | 110 | 98 | 80 | 77 |
| Total HR (300° C. to 700° C.) | kJ/g | 8.1 | 8.5 | 9.4 | 9.5 | 10.2 |

EXL2335 was used as an example of the family of core-shell impact modifiers. The control sample is very brittle having an ASTM notched Izod of 1.1 ft-lbs/in. The addition of 3% of the EXL2335 doubles the NI and provides a tough and useful blend. At 10% of EXL2335, the NI values are almost 8 times that of the control and 75% ductile. In addition these compositions are both compliant with both the FAA 60 sec Vertical burn and 65/65 OSU requirements. In addition the compositions have MARHE values of less than the 90 kW/m$^2$ as required by the EN45545 rail norm. Other ratios of PEI/ITR-PC-Si are expected to produce even higher NI values. Other PEI structures are expected to provide similar results.

Figure 7:
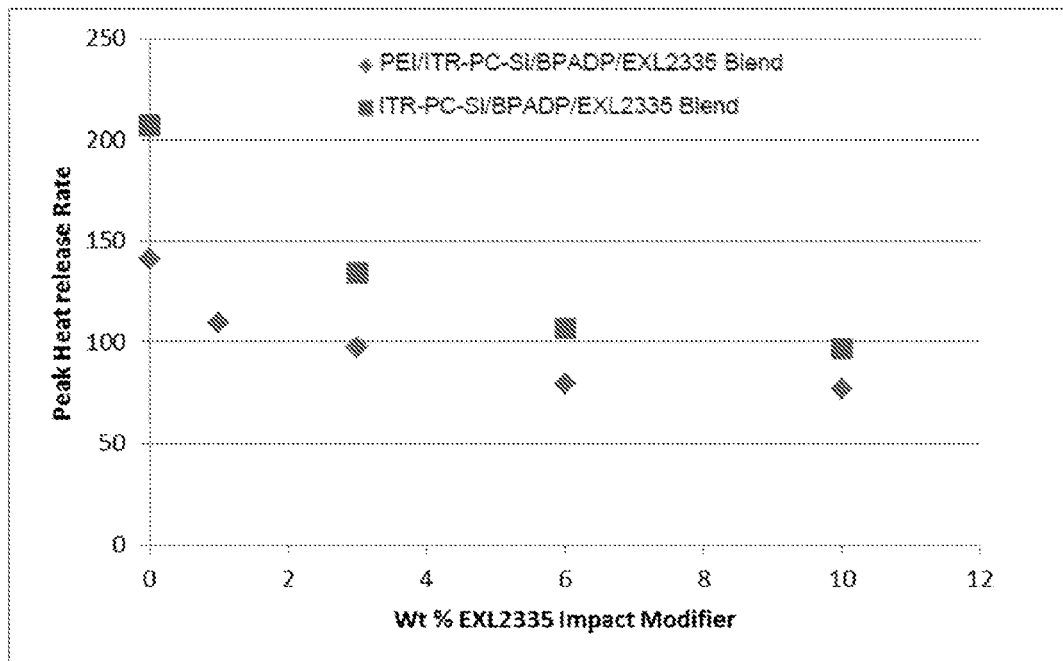
FIG. 7 compares the effect of adding EXL2335 to a blend of ITR-PC-Si/BPADP and a blend of ITR-PC-Si/BPADP/PEI on peak heat release rate.
Figure 8:
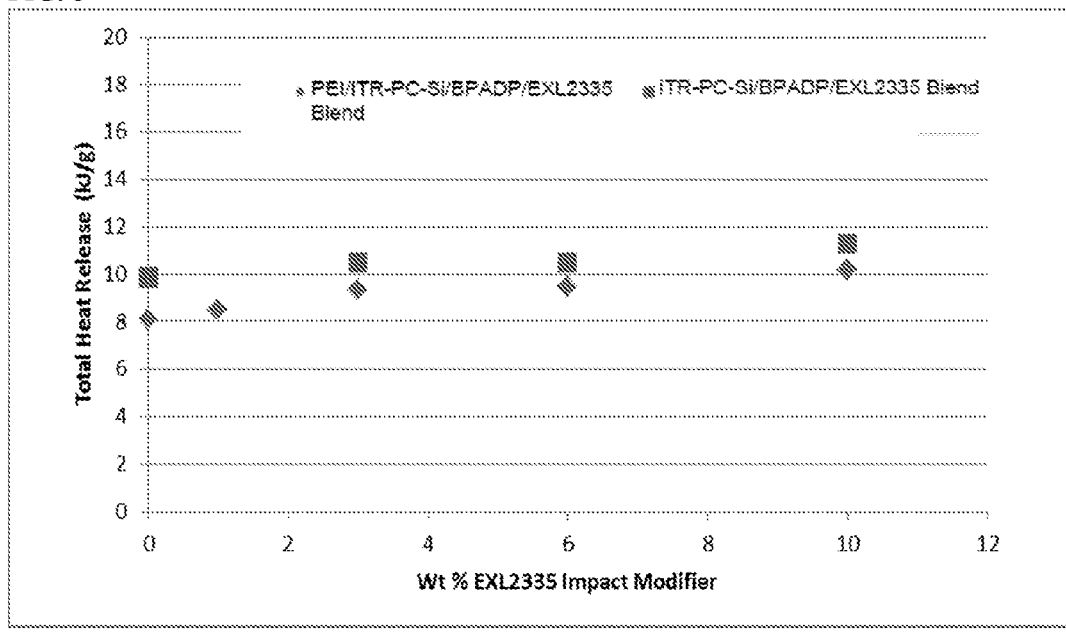
FIG. 8 compares the effect of adding EXL2335 to a blend of ITR-PC-Si/BPADP and a blend of ITR-PC-Si/BPADP/PEI on total heat release rate as measured by microscale combustion calorimetry.

Table 9 also shows that the added impact modifiers, which are usually assumed in the art to significantly reduce the flame performance of resins actually either dramatically decreases the peak heat release rate or affords a tolerable increase depending on the test method (Table 9 and FIGS. 7 and 8). The addition of the PEI to the blends improves the heat release rate over the ITR-PC-Si and BPADP (blend 2) formulations. As shown in FIGS. 7 and 8 there is a slight, but acceptable increase in the total heat release by MCC, but a negligible increase by OSU and microscale combustion calorimetry.

In summary, in a surprising feature of the present discovery, it was observed that a small amount of certain core-shell impact modifiers work effectively not only in improving the impact resistance of the brittle polymer matrix such as polycarbonate-siloxane-arylates and polycarbonate-siloxane-arylates/PEI combinations, but also in enhancing the char layer formation during the burning process such as OSU 65/65 burning process. For the formulations comprising a small amount of selected core-shell impact modifiers, a good quality char layer can form earlier during the OSU 65/65 burning process, hence reducing the chance of the underneath material exposing to oxygen and heat, compared to the control formulation (i.e., without impact modifier). The formation of a good protective char layer earlier in the burning process can offset the effect of added "fuel" (i.e., impact modifier itself) onto the heat release performance of the formulations in this invention. As supportive evidence, Table 10 shows the time of the first heat release peak occurrence and char height comparison of the inventive examples and comparative example in the OSU 65/65 test.

TABLE 10

| Condition # | Formulation | Formulation Description | Sample thickness (mm) | Average char layer height (cm) | OSU-2 min total heat release (kW-min/m$^2$) | OSU-peak heat release rate (kW/m$^2$) | OSU-Time of 1$^{st}$ heat release peak (sec) |
|---|---|---|---|---|---|---|---|
| JZ-13-69 | FST-1 | 88% ITR-PC-Si and 12% TBBPA/BPA | 1.0 | 4.0 | 3.4 | 33 | 87 |
| JZ-14-47F | YH71-1 | FST-1 + 1% EXL2335 | 1.0 | 4.8 | 41.8 | 33.5 | 44 |
| JZ-14-16F | CPPT2 | FST-1 + 3% EXL2335 | 1.0 | 5.5 | 36 | 36 | 38 |
| JZ-14-48F | YF71-2 | FST-1 + 3% EXL2330 acrylic core-shell | 1.0 | 5.8 | 30 | 32.3 | 49 |
| JZ-14-30F | CPPT-4 | FST-1 + 3% EXL2691J | 1.0 | 4.5 | 52 | 46 | 45 |

Embodiment 1

A thermoplastic composition comprising, based on the total weight of the polymers in the thermoplastic composition, a polycarbonatesiloxane-arylate; 2 to 15 wt % or 2 to 8 wt % or 2 to 6 wt % or 1 to 4 wt % of a core-shell impact modifier; a flame retardant comprising a bromine-containing polymer or oligomer effective to provide 1.5 to 5 wt % of bromine, based on the total weight of the polymers in the composition, an aromatic organophosphorus compound effective to provide 0.1 to 2.0 wt % of phosphorus, based on the total weight of the polymers in the composition, or a combination comprising at least one of the foregoing; and optionally 5 to 80 wt % or 10 to 60 wt % of a polyetherimide; wherein a formed sample of the composition has a flame time of less than 15 seconds, a burn length of less than 6 inches, and a drip extinguishing time of less than 3 seconds, each measured using the method of FAR 25.853(d), in accordance with FAR 25.853(a)(1)(i) at a thickness of 1.5 mm; an OSU integrated 2 minute test value of less than 65 kW-min/m$^2$ and a peak heat release value of less than 65 kW/m$^2$ as measured at 1.5 mm in accordance with FAR 25.853(d); and a notched Izod value of greater than or equal to 2 ft-lbs/in at 23° C. in accordance to ASTM D256 at a thickness of 3.2 mm.

Embodiment 2

The composition of embodiment 1, wherein a sample of the composition has at least one of the following properties: an average peak smoke density within 4-minute equal to or less than 200 as regulated by FAR 25-853(d); an average peak smoke density within 4-minute equal to or less than 150 as regulated by airbus ABD0031/ATS1000; a smoke extracted from a NBS smoke chamber and measured by Draeger tube having an average concentration of the following gas components: HF<100 ppm, HCl<150 ppm, HCN<150 ppm, SO$_2$/H$_2$S<100 ppm, NO/NO$_2$<100 ppm, and CO<1000 ppm; a 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116; and a maximum averaged rate of heat emission of less than or equal to 90 kW/m$^2$ with 50 kW/m$^2$ irradiance level test condition according to ISO 5660-1.

Embodiment 3

A thermoplastic composition comprising, based on the total weight of the polymers in the thermoplastic composition, a polycarbonatesiloxane-arylate; 2 to 15 wt % or 2 to 8 wt % or 2 to 6 wt % of a core-shell impact modifier; and a bromine-containing polymer or oligomer effective to provide 1.5 to 5 wt % of bromine, based on the total weight of the polymers in the composition; wherein a sample of the composition has a notched Izod value of greater than or equal to 5 ft-lbs/in at 23° C. in accordance to ASTM D256 at a thickness of 3.2 mm.

Embodiment 4

The composition of embodiment 1 or embodiment 2, comprising, based on the total weight of the polymers in the thermoplastic composition, a polycarbonatesiloxane-arylate; 1 to 4 wt % of a core-shell impact modifier comprising a butyl acrylate-methyl methacrylate copolymer having a core of poly(butyl acrylate) and a grafted shell of poly(methyl methacrylate) and a rubber grafted acrylonitrile-butadiene-styrene copolymer with rubber content greater than 50% by weight of the copolymer, a butyl acrylate-styrene-acrylonitrile copolymer, or a combination comprising at least one of the foregoing; and an aromatic organo-phosphorus compound that provides 0.1 to 2.0 wt % of phosphorus; wherein a sample of the composition has a notched Izod value of greater than or equal to 4 ft-lbs/in at 23° C. in accordance to ASTM D256 at a thickness of 3.2 mm.

Embodiment 5

The composition of embodiment 1 or embodiment 2, comprising, based on the total weight of the polymers in the thermoplastic composition, a polycarbonatesiloxane-arylate; 2 to 15 wt %, or 2 to 8 wt %, or 2 to 6 wt % of a core-shell impact modifier; an aromatic organophosphorus compound effective to provide 0.1 to 2.0 wt % of phosphorus, based on the total weight of the polymers in the composition; and 5 to 80 wt. % or 10 to 60 wt. % of the polyetherimide.

Embodiment 6

The composition of any one or more of embodiments 1 to 5, wherein the polycarbonatesiloxane-arylate comprises 0.2 to 10 wt % siloxane units, 50 to 99.6 wt % arylate units, and 0.2 to 49.8 wt % carbonate units, each based on the weight of the polycarbonatesiloxane-arylate.

Embodiment 7

The composition of any one or more of embodiments 1 to 6, wherein the arylate units are isophthalate-terephthalate-resorcinol ester units; the carbonate units are bisphenol A carbonate units, resorcinol carbonate units, or a combination thereof; and the siloxane units are of the formula (10a), (10b), (10c), or a combination comprising at least one of the foregoing, wherein E has an average value of 2 to 200.

Embodiment 8

The composition of any one of embodiments 1-3 and 5-7, wherein the core-shell impact modifier comprises a core comprising an acrylate rubber, a silicone rubber, or a butadiene based rubber, and a shell derived from a vinyl aromatic compound, a vinyl cyanide, an alkyl(meth)acrylate, (meth) acrylic acid, or a combination comprising at least at least one of the foregoing.

Embodiment 9

The composition of any one of embodiments 1-3 and 5-8, wherein the core-shell impact modifier comprises methacrylate-butadiene-styrene core-shell impact modifier, butyl acrylate-styrene-acrylonitrile, acrylonitrile-butadiene-styrene, silicone-acrylic-based rubber, butyl acrylate-methyl methacrylate polymer having a core of poly(butyl acrylate) and a shell of poly(methyl methacrylate), or a combination comprising at least one of the foregoing, preferably the core-shell impact modifier comprises a butyl acrylate-methyl methacrylate copolymer having a core of poly(butyl acrylate) and a grafted shell of poly(methyl methacrylate) and a high rubber grafted acrylonitrile-butadiene-styrene (HRG-ABS) copolymer with rubber content greater than 50% by weight of the copolymer, a butyl acrylate-styrene-acrylonitrile copolymer, or a combination comprising at least one of the foregoing.

Embodiment 10

The composition of any one of embodiments 1, 2, and 4-9, where the aromatic organophosphorus compound comprises at least one organic aromatic group and at least one phosphorus-containing group, or an organic compound having at least one phosphorus-nitrogen bond.

Embodiment 11

The composition of embodiment 9, wherein the organophosphorus compound is bisphenol A bis(diphenyl phosphate), triphenyl phosphate, resorcinol bis(diphenyl phosphate), tricresyl phosphate, a phenol/bi-phenol polyphosphate, an oligomeric phosphate ester, or a combination comprising at least one of the foregoing.

Embodiment 12

The composition of embodiment 1, comprising, based on the total weight of the polymers in the composition, 2 to 8.5 wt % or 3 to 8.5 wt % of a core-shell impact modifier having a core of poly(butyl acrylate) and a shell of poly(methyl methacrylate); 75 to 90 wt % of a poly(bisphenol-A carbonate)-co-poly(isophthalate-terephthalate-resorcinol ester)-co-poly(siloxane) which comprises siloxane units of the formula (10a), (10b), or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane); 5 to 15 wt % or 10 to 15 wt % of a bromine-containing polymer comprising brominated carbonate units derived from 2,2',6,6'-tetrabromo-4,4'-isopropylidenediphenol and carbonate units derived from bisphenol A; and optionally, up to 12 wt % of an additive, wherein the additive is a processing aid, a heat stabilizer, an ultra violet light absorber, a colorant, or a combination comprising at least one of the foregoing, wherein a sample of the composition has a notched Izod value of greater than or equal to 10 ft-lbs/in at 23° C. in accordance to ASTM D256 at a thickness of 3 or 3.2 mm.

Embodiment 13

The composition of embodiment 1 comprising, based on the total weight of the polymers in the composition, 2 to 8 wt %, 2 to 6 wt %, or 2 to 4 wt % of a core-shell impact modifier having a core of poly(butyl acrylate) and a shell of poly(methyl methacrylate); 80 to 98 wt % of a poly(bisphenol-A carbonate)-co-poly(isophthalate-terephthalate-resorcinol ester)-co-poly(siloxane) which comprises siloxane units of the formula (10a), (10b), or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane); an aromatic phosphorus compound effective to provide 0.1 to 2 wt % of phosphorus; and optionally, up to 12 wt % of an additive comprising a processing aid, a heat stabilizer, an ultra violet light absorber, a colorant, or a combination comprising at least one of the foregoing, wherein the aromatic organophosphorus compound is of the formula (15) wherein each of $R^{16}$, $R^{17}$, $R^{18}$, and $R^{19}$ is phenyl, X is of the formula (16), each n is 1, and q is 1-5; and wherein a sample of the composition has a notched Izod value of greater than or equal to 10 ft-lbs/in at 23° C. in accordance to ASTM D256 at a thickness of 3.2 mm.

Embodiment 14

The composition of embodiment 1, comprising, based on the total weight of the polymers in the composition, 2 to 15 wt % of a core-shell impact modifier having a core of poly(butyl acrylate) and a shell of poly(methyl methacrylate); 30 to 60 wt % of a poly(bisphenol-A carbonate)-co-poly(isophthalate-terephthalate-resorcinol ester)-co-poly(siloxane) which comprises siloxane units of the formula (10a), (10b), or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane); 40 to 60 wt % of a polyetherimide; optionally, an aromatic phosphorus compound in an effective amount to provide 0.1 to 2 wt % of phosphorus; and optionally, up to 12 wt % of an additive comprising a processing aid, a heat stabilizer, an ultra violet light absorber, a colorant, or a combination comprising at least one of the foregoing, wherein the aromatic organophosphorus compound is of the formula (15) wherein each of $R^{16}$, $R^{17}$, $R^{18}$, and $R^{19}$ is phenyl, X is of the formula (16) each n is 1, and q is 1-5; wherein a sample of the composition has a flame time of less than 15 seconds, a burn length of less than 6 inches, and a drip extinguishing time of less than 5 seconds, each measured using the method of FAR25.853, in accordance with FAR 25.853(a)(1)(i) at a thickness of 1.5 mm; and a notched Izod value of greater than or equal to 10 ft-lbs/in at 23° C. in accordance to ASTM D256 at a thickness of 3.2 mm.

Embodiment 15

The composition of embodiment 13 or 14, wherein the composition comprises 2 to 8 wt % of bisphenol A bis (diphenyl phosphate).

Embodiment 16

The composition of any one of embodiments 1-15 further comprising 1 to 5 wt % of talc.

Embodiment 17

An article comprising the composition of any one of embodiments 1 to 16, wherein the article is a molded article, a thermoformed article, an extruded film, an extruded sheet, a foamed article, a layer of a multi-layer article, a substrate for a coated article, or a substrate for a metallized article, optionally the article has a thickness of 0.1 to 10 mm.

Embodiment 18

The article of embodiment 17, wherein the article is a transportation component, for example, the article is a train or aircraft interior component, wherein the component is a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

Embodiment 19

The article of any one of embodiments 17 to 18, wherein the article is a thermoformable decorative laminate comprising a surface layer, a backing layer, and a color layer disposed between the surface layer and the backing layer, wherein the surface layer, the backing layer, or both comprise the composition of any one of embodiments 1 to 16.

Embodiment 20

A method of manufacture of an article, comprising molding, extruding, foaming, or casting the composition of any one of embodiments 1 to 16.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" to a straight or branched chain, saturated, divalent hydrocarbon group; "alkylidene" to a straight or branched chain, saturated divalent hydrocarbon group, with both valences on a single common carbon atom; "alkenyl" to a straight or branched chain monovalent hydrocarbon group having at least two carbons joined by a carbon-carbon double bond; "cycloalkyl" to a non-aromatic monovalent monocyclic or multicyclic hydrocarbon group having at least three carbon atoms, "cycloalkenyl" to a non-aromatic cyclic divalent hydrocarbon group having at least three carbon atoms, with at least one degree of unsaturation; "aryl" to an aromatic monovalent group containing only carbon in the aromatic ring or rings; "arylene" to an aromatic divalent group containing only carbon in the aromatic ring or rings; "alkylaryl" to an aryl group that has been substituted with an alkyl group as defined above, with 4-methylphenyl being an exemplary alkylaryl group; "arylalkyl" to an alkyl group that has been substituted with an aryl group as defined above, with benzyl being an exemplary arylalkyl group; "acyl" to an alkyl group as defined above with the indicated number of carbon atoms attached through a carbonyl carbon bridge (—C(=O)—); "alkoxy" to an alkyl group as defined above with the indicated number of carbon atoms attached through an oxygen bridge (—O—); and "aryloxy" to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a substituted position include cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising, based on the total weight of the polymers in the thermoplastic composition,
   a polycarbonatesiloxane-arylate;
   2 to 15 wt % of a core-shell impact modifier;
   a flame retardant comprising a bromine-containing polymer or oligomer effective to provide 1.5 to 5 wt % of bromine, based on the total weight of the polymers in the composition, an aromatic organophosphorus compound effective to provide 0.1 to 2.0 wt % of phosphorus, based on the total weight of the polymers in the composition, or a combination comprising at least one of the foregoing; and
   optionally 5 to 80 wt % of a polyetherimide;
   wherein a formed sample of the composition has
      a flame time of less than 15 seconds, a burn length of less than 6 inches, and a drip extinguishing time of less than 3 seconds, each measured using the method of FAR 25.853(d), in accordance with FAR 25.853(a)(1)(i) at a thickness of 1.5 mm;
      an OSU integrated 2 minute test value of less than 65 kW-min/m$^2$ and a peak heat release value of less than 65 kW/m$^2$ as measured at 1.5 mm in accordance with FAR 25.853(d); and
      a notched Izod value of greater than or equal to 2 ft-lbs/in at 23° C. in accordance to ASTM D256 at a thickness of 3.2 mm.

2. The composition of claim 1, wherein a sample of the composition has at least one of the following properties:
   i) an average peak smoke density within 4-minute equal to or less than 200 as regulated by FAR 25-853(d); an average peak smoke density within 4-minute equal to or less than 150 as regulated by airbus ABD0031/ATS1000;
   ii) a smoke extracted from a NBS smoke chamber and measured by Draeger tube having an average concentration of the following gas components: HF<100 ppm, HCl<150 ppm, HCN<150 ppm, SO$_2$/H$_2$S<100 ppm, NO/NO$_2$<100 ppm, and CO<1000 ppm;
   iii) a 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116; and iv) a maximum averaged rate of heat emission of less than or equal to 90 kW/m² with 50 kW/m² irradiance level test condition according to ISO 5660-1.

3. The thermoplastic composition of claim 1, wherein the flame retardant comprises the bromine-containing polymer or oligomer effective to provide 1.5 to 5 wt % of bromine, based on the total weight of the polymers in the composition; and wherein the sample of the composition has a notched Izod value of greater than or equal to 5 ft-lbs/in at 23° C. in accordance to ASTM D256 at a thickness of 3.2 mm.

4. The composition of claim 1, comprising, based on the total weight of the polymers in the thermoplastic composition,
a polycarbonatesiloxane-arylate;
1 to 4 wt % of a core-shell impact modifier comprising a butyl acrylate-methyl methacrylate copolymer having a core of poly(butyl acrylate) and a grafted shell of poly(methyl methacrylate) and a rubber grafted acrylonitrile-butadiene-styrene copolymer with rubber content greater than 50% by weight of the copolymer, a butyl acrylate-styrene-acrylonitrile copolymer, or a combination comprising at least one of the foregoing; and
an aromatic organophosphorus compound that provides 0.1 to 2.0 wt % of phosphorus;
wherein a sample of the composition has a notched Izod value of greater than or equal to 4 ft-lbs/in at 23° C. in accordance to ASTM D256 at a thickness of 3.2 mm.

5. The composition of claim 1, comprising, based on the total weight of the polymers in the thermoplastic composition,
a polycarbonatesiloxane-arylate;
2 to 15 wt % of a core-shell impact modifier;
an aromatic organophosphorus compound effective to provide 0.1 to 2.0 wt % of phosphorus, based on the total weight of the polymers in the composition; and
5 to 80 wt. % or 10 to 60 wt. % of the polyetherimide.

6. The composition of claim 1, wherein the polycarbonatesiloxane-arylate comprises
0.2 to 10 wt % siloxane units,
50 to 99.6 wt % arylate units, and
0.2 to 49.8 wt % carbonate units,
each based on the weight of the polycarbonatesiloxane-arylate.

7. The composition of claim 1, wherein
the arylate units are isophthalate-terephthalate-resorcinol ester units;
the carbonate units are bisphenol A carbonate units, resorcinol carbonate units, or a combination thereof; and
the siloxane units are of the formula

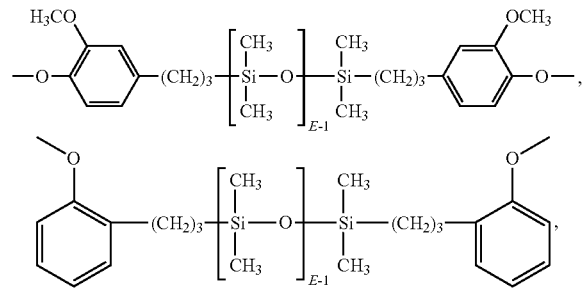

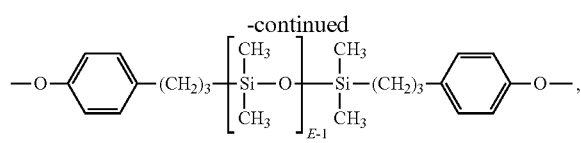

or a combination comprising at least one of the foregoing, wherein E has an average value of 2 to 200.

8. The composition of claim 1, wherein the core-shell impact modifier comprises a core comprising an acrylate rubber, a silicone rubber, or a butadiene based rubber, and a shell derived from a vinyl aromatic compound, a vinyl cyanide, an alkyl(meth)acrylate, (meth)acrylic acid, or a combination comprising at least at least one of the foregoing.

9. The composition of claim 1, wherein the core-shell impact modifier comprises methacrylate-butadiene-styrene core-shell impact modifier, butyl acrylate-styrene-acrylonitrile, acrylonitrile-butadiene-styrene, silicone-acrylic-based rubber, butyl acrylate-methyl methacrylate polymer having a core of poly(butyl acrylate) and a shell of poly(methyl methacrylate), or a combination comprising at least one of the foregoing.

10. The composition of claim 1, where the aromatic organophosphorus compound comprises at least one organic aromatic group and at least one phosphorus-containing group, or an organic compound having at least one phosphorus-nitrogen bond.

11. The composition of claim 10, wherein the aromatic organophosphorus compound is bisphenol A bis(diphenyl phosphate), triphenyl phosphate, resorcinol bis(diphenyl phosphate), tricresyl phosphate, a phenol/bi-phenol polyphosphate, an oligomeric phosphate ester, or a combination comprising at least one of the foregoing.

12. The composition of claim 1, comprising, based on the total weight of the polymers in the composition,
2 to 8.5 wt % of a core-shell impact modifier having a core of poly(butyl acrylate) and a shell of poly(methyl methacrylate);
75 to 90 wt % of a poly(bisphenol-A carbonate)-co-poly(isophthalate-terephthalate-resorcinol ester)-co-poly(siloxane) which comprises siloxane units of the formula

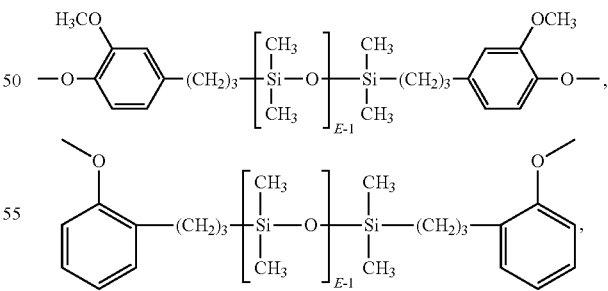

or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane);
5 to 15 wt % of a bromine-containing polymer comprising brominated carbonate units derived from 2,2',6,6'-tetrabromo-4,4'-isopropylidenediphenol and carbonate units derived from bisphenol A; and optionally, up to 12 wt % of an additive, wherein the additive is a processing aid, a heat stabilizer, an ultra violet light absorber, a colorant, or a combination comprising at least one of the foregoing, wherein a sample of the composition has a notched Izod value of greater than or equal to 10 ft-lbs/in at 23° C. in accordance to ASTM D256 at a thickness of 3 or 3.2 mm.

13. The composition of claim 1, comprising, based on the total weight of the polymers in the composition,
2 to 8 wt % of a core-shell impact modifier having a core of poly(butyl acrylate) and a shell of poly(methyl methacrylate);
80 to 98 wt % of a poly(bisphenol-A carbonate)-co-poly(isophthalate-terephthalate-resorcinol ester)-co-poly(siloxane) which comprises siloxane units of the formula

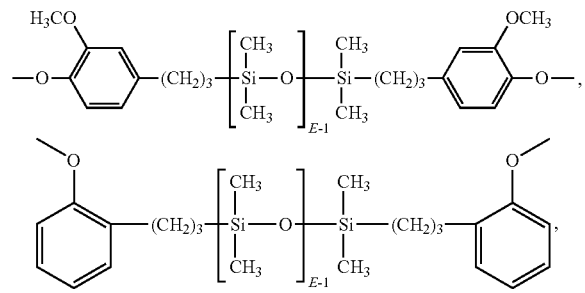

or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane);

an aromatic phosphorus compound effective to provide 0.1 to 2 wt % of phosphorus;

and optionally, up to 12 wt % of an additive comprising a processing aid, a heat stabilizer, an ultra violet light absorber, a colorant, or a combination comprising at least one of the foregoing, wherein the aromatic organophosphorus compound is of the formula

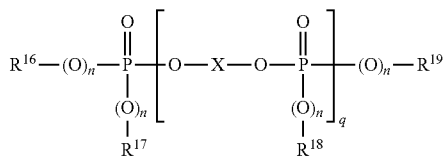

wherein
each of $R^{16}$, $R^{17}$, $R^{18}$, and $R^{19}$ is phenyl, X is of the formula

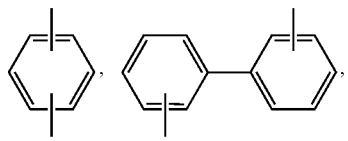

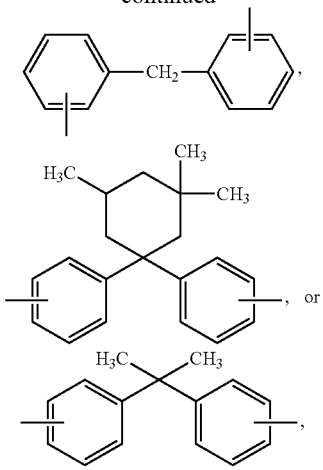

each n is 1, and q is 1-5; and wherein a sample of the composition has a notched Izod value of greater than or equal to 10 ft-lbs/in at 23° C. in accordance to ASTM D256 at a thickness of 3.2 mm.

14. The composition of claim 1, comprising, based on the total weight of the polymers in the composition,
2 to 15 wt % of a core-shell impact modifier having a core of poly(butyl acrylate) and a shell of poly(methyl methacrylate);
30 to 60 wt % of a poly(bisphenol-A carbonate)-co-poly(isophthalate-terephthalate-resorcinol ester)-co-poly(siloxane) which comprises siloxane units of the formula

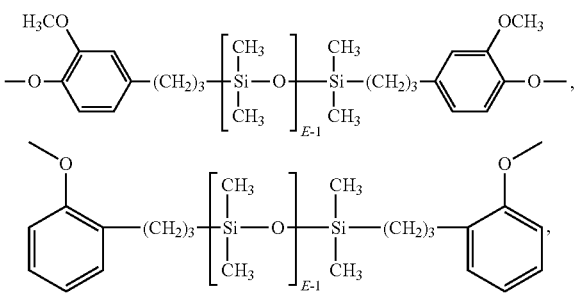

or a combination thereof, wherein E has an average value of 5 to 60, and the siloxane units are present in an amount effective to provide 0.1 to 10 wt % of siloxane units, based on the weight of the poly(bisphenol-A carbonate)-co-poly(isophthalate-terephthalate-resorcinol ester)-co-poly(siloxane);

40 to 60 wt % of a polyetherimide;

optionally, an aromatic phosphorus compound in an effective amount to provide 0.1 to 2 wt % of phosphorus; and optionally, up to 12 wt % of an additive comprising a processing aid, a heat stabilizer, an ultra violet light absorber, a colorant, or a combination comprising at least one of the foregoing, wherein the aromatic organophosphorus compound is of the formula

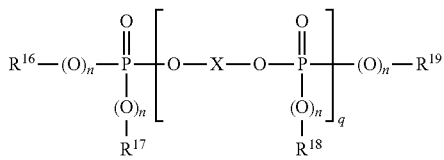

wherein
each of $R^{16}$, $R^{17}$, $R^{18}$, and $R^{19}$ is phenyl,
X is of the formula

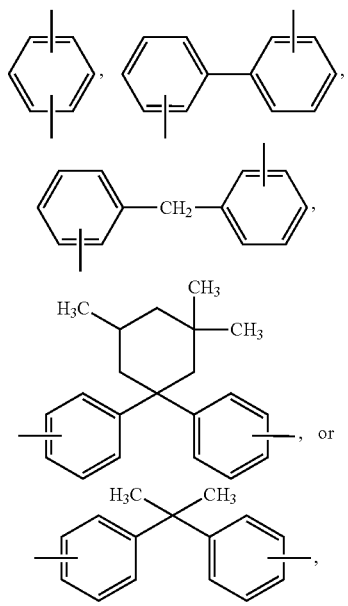

each n is 1, and
q is 1-5;
wherein a sample of the composition has
a flame time of less than 15 seconds, a burn length of less than 6 inches, and a drip extinguishing time of less than 5 seconds, each measured using the method of FAR25.853, in accordance with FAR 25.853(a)(1)(i) at a thickness of 1.5 mm; and
a notched Izod value of greater than or equal to 10 ft-lbs/in at 23° C. in accordance to ASTM D256 at a thickness of 3.2 mm.

15. The composition of claim 13, wherein the composition comprises 2 to 8 wt % of bisphenol A bis(diphenyl phosphate).

16. The composition of claim 1 further comprising 1 to 5 wt % of talc.

17. An article comprising the composition of claim 1, wherein the article is a molded article, a thermoformed article, an extruded film, an extruded sheet, a foamed article, a layer of a multi-layer article, a substrate for a coated article, or a substrate for a metallized article.

18. The article of claim 17, wherein the article is a transportation component.

19. The article of claim 17, wherein the article is a thermoformable decorative laminate comprising a surface layer, a backing layer, and a color layer disposed between the surface layer and the backing layer, wherein the surface layer, the backing layer, or both comprise the composition of claim 1.

20. A method of manufacture of an article, comprising molding, extruding, foaming, or casting the composition of claim 1.

21. A thermoplastic composition comprising, based on the total weight of the polymers in the thermoplastic composition,
a polycarbonatesiloxane-arylate;
2 to 15 wt % of a core-shell impact modifier;
a bromine-containing polymer or oligomer effective to provide 1.5 to 5 wt % of bromine, based on the total weight of the polymers in the composition; and
an aromatic organophosphorus compound effective to provide 0.1 to 2.0 wt % of phosphorus, based on the total weight of the polymers in the composition;
wherein a sample of the composition has a notched Izod value of greater than or equal to 5 ft-lbs/in at 23° C. in accordance to ASTM D256 at a thickness of 3.2 mm.

22. A thermoplastic composition comprising, based on the total weight of the polymers in the thermoplastic composition,
a polycarbonatesiloxane-arylate;
2 to 15 wt % of a core-shell impact modifier;
a bromine-containing polymer or oligomer effective to provide 1.5 to 5 wt % of bromine, based on the total weight of the polymers in the composition; and
5 to 80 wt % of a polyetherimide;
wherein a sample of the composition has a notched Izod value of greater than or equal to 5 ft-lbs/in at 23° C. in accordance to ASTM D256 at a thickness of 3.2 mm.

* * * * *